US012222821B2

(12) United States Patent
Dangi et al.

(10) Patent No.: US 12,222,821 B2
(45) Date of Patent: *Feb. 11, 2025

(54) SERVER-SIDE INLINE GENERATION OF VIRTUAL SYNTHETIC BACKUPS USING GROUP FINGERPRINTS

(71) Applicant: Dell Products L.P., Round Rock, TX (US)

(72) Inventors: Salil Dangi, Mission Viejo, CA (US); Gokul Prasanna Mani, Apex, NC (US); Donna Barry Lewis, Holly Springs, NC (US)

(73) Assignee: Dell Products L.P., Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/365,456

(22) Filed: Aug. 4, 2023

(65) Prior Publication Data

US 2024/0036983 A1 Feb. 1, 2024

Related U.S. Application Data

(63) Continuation-in-part of application No. 17/873,769, filed on Jul. 26, 2022.

(51) Int. Cl.
*G06F 11/14* (2006.01)

(52) U.S. Cl.
CPC ...... *G06F 11/1464* (2013.01); *G06F 11/1435* (2013.01); *G06F 11/1453* (2013.01)

(58) Field of Classification Search
None
See application file for complete search history.

(56) References Cited

U.S. PATENT DOCUMENTS

| 9,398,016 | B1 * | 7/2016 | Chakraborty | ............ H04L 63/20 |
| 10,346,256 | B1 * | 7/2019 | Levin-Michael | ..... H04L 9/3239 |
| 2019/0034288 | A1 * | 1/2019 | Rangapuram | ....... G06F 11/1451 |

* cited by examiner

*Primary Examiner* — Belix M Ortiz Ditren
(74) *Attorney, Agent, or Firm* — Staniford Tomita LLP

(57) ABSTRACT

Making inline deduplicated backups of protected data using group fingerprints resident in a storage server by generating group fingerprints on a storage server for a backup client that is not capable of using group fingerprints, from individual fingerprints generated for each segment of protected data divided into variable size segments and then grouped together. Each fingerprint comprises a signature for a respective data segment. The method further maintains the group fingerprints for files resident on the storage server, compares, in the storage server, respective group fingerprints for these files with a new backup file to be backed up from the backup client to determine duplicated data between these files, and converts the new backup file to a virtual synthetic backup during a backup time of the new file.

20 Claims, 18 Drawing Sheets

1602

| FP 131 | FP 132 | FP 133 | FP 134 | | FP 141 | FP 142 | FP 143 | FP 144 |
| FP 231 | FP 232 | FP 233 | FP 234 | | FP 241 | FP 242 | FP 243 | FP 244 |
| FP 321 | FP 322 | FP 323 | FP 324 | | FP 351 | FP 352 | FP 353 | FP 354 |

1604  GFP 13    GFP 14

| FP 131 | FP 132 | FP 133 | FP 134 | | FP 141 | FP 142 | FP 143 | FP 144 |

GFP 23    GFP 24

| FP 231 | FP 232 | FP 233 | FP 234 | | FP 241 | FP 242 | FP 243 | FP 244 |

GFP 33    GFP 35

| FP 321 | FP 322 | FP 323 | FP 324 | | FP 351 | FP 352 | FP 353 | FP 354 |

1606

L1-(FPs 131,132,133,134,141,142,143,144)
| FP 131 | FP 132 | FP 133 | FP 134 | | FP 141 | FP 142 | FP 143 | FP 144 |

L1-(FPs 231,232,233,234,241,242,243,244)
| FP 231 | FP 232 | FP 233 | FP 234 | | FP 241 | FP 242 | FP 243 | FP 244 |

L1-(FPs 421,422,423,424,351,352,353,354)
| FP 421 | FP 422 | FP 423 | FP 424 | | FP 351 | FP 352 | FP 353 | FP 354 |

FIG. 16

SERVER-SIDE INLINE GENERATION OF VIRTUAL SYNTHETIC BACKUPS USING GROUP FINGERPRINTS

CROSS-REFERENCE TO RELATED APPLICATIONS

This application is a Continuation-in-Part application of U.S. patent application Ser. No. 17/873,769 filed on Jul. 26, 2022 and entitled "Targeted Deduplication Using Server Generated Group Fingerprints For Virtual Synthesis," which is assigned to the assignee of the present application, and which is hereby incorporated by reference in its entirety.

TECHNICAL FIELD

Embodiments relate generally to deduplication storage systems, and more specifically to enhanced client-side targeted deduplication using virtual synthesis.

BACKGROUND OF THE INVENTION

Data is typically backed up by copying the data from a data source (backup client) to a data target, such as a storage server or appliance. Data deduplication is a form of single-instance storage that eliminates redundant copies of data to reduce storage overhead. Data compression methods are used to store only one unique instance of data by replacing redundant data blocks with pointers to the unique data copy. As new data is written to a system, duplicate chunks are replaced with these pointer references to previously stored data. Though storage requirements are greatly reduced, processing overhead is increased through the processes of deduplication.

Different types of backups can be performed during the course of a regular backup schedule. A full backup copies all data from a source to a destination in a single backup session, while an incremental backup only copies data that has changed since a last backup, and a differential backup copies data that has changed since a last full backup. A synthetic backup is a full backup that is created by combining a previous full backup with subsequent incremental backups, and as such, requires less time to complete than a regular full backup.

Many present backup applications create virtual synthetic based backups by stitching together a current backup using previous backup data already stored on the storage appliance, as opposed to traditional deduplication where the logic segments, fingerprints, and filters all the data to be backed up. Creating a synthesized backup generally saves network bandwidth and can also enable enhanced replication and cyber recovery optimizations by capturing recipes of these synthesis operations. However, this type of backup requires applications to know what data has specifically changed from one backup to the next using techniques such as Change Block Tracking (CBT). As a result, many asset types (e.g., databases) that lack this knowledge cannot take advantage of virtual synthetic backups.

Certain methods have been developed for using client-based persistent caches for identifying duplicate group fingerprints and creating virtual copies when these are detected. Such systems, however, require that the group fingerprints used on the client to identify duplicate data be persistently stored ("persisted") on the client system. It would be advantageous to instead allow the group fingerprints to be retrieved on an 'on demand' basis rather than constantly and persistently stored on the client.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, Data Domain Restorer, and Data Domain Boost (DDBoost) are trademarks of Dell EMC Corporation.

BRIEF DESCRIPTION OF THE DRAWINGS

In the following drawings, like reference numerals designate like structural elements. Although the figures depict various examples, the one or more embodiments and implementations described herein are not limited to the examples depicted in the figures.

FIG. 16 illustrates a portion of an example file N1 represented in a virtual synthetic format, under an example embodiment.

DETAILED DESCRIPTION

Figure 1:
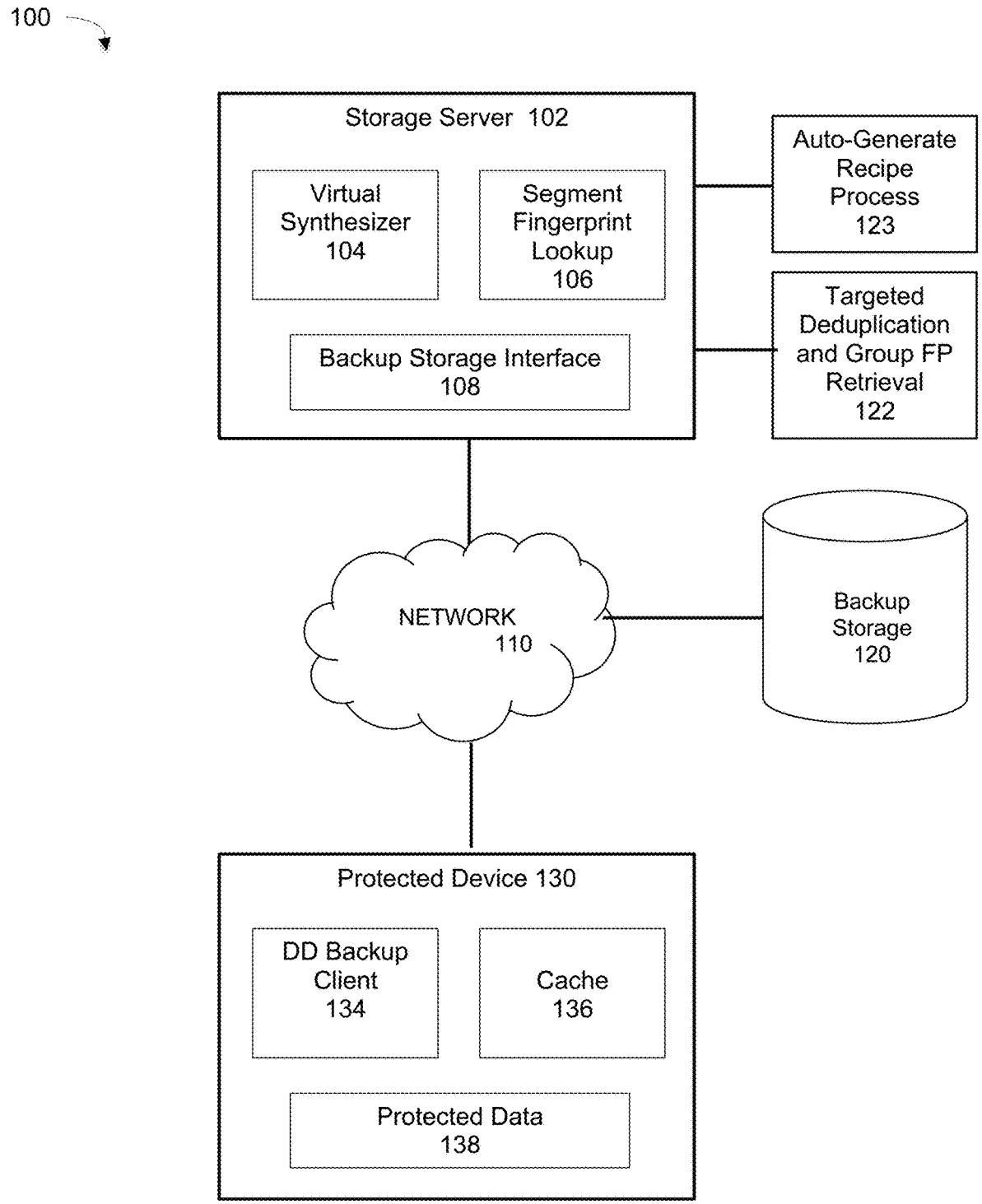
FIG. 1 illustrates a computer network system implementing a method for client-side targeted deduplication using virtual synthesis with an as-needed fingerprint retrieval process, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory.

Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve software and systems deployed in a distributed system, such as a cloud based network system or very large-scale wide area network (WAN), metropolitan area network (MAN), however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

FIG. 1 illustrates a computer network system implementing a method for client-side targeted deduplication using virtual synthesis with an as-needed fingerprint retrieval process, under some embodiments, under some embodiments. System 100 includes processing component 122 that enables virtual synthetic backups for applications that do not have sufficient knowledge of what changes (e.g., changed blocks) were made from a previous backup to use the virtual synthetic operations on their own.

In the example system 100, deduplication backup storage server 102 communicates with a protected device or backup client 130 via network 110. Backup data from protected device 130 is stored in deduplication backup storage 120, which is coupled to and managed by storage server 102, either directly or through the network 110. Storage server 102 includes virtual synthesizer 104, segment fingerprint lookup 106, and backup storage interface 108. Protected device 130 includes deduplication backup client 134, protected data 138, and cache 136. For clarity, only a single backup storage device and a single protected device are shown, however many additional storage and protected devices may be used depending on the network scale and backup configuration.

In system 100, storage server 102 executes a data storage or backup management process that coordinates or manages the backup of data from one or more data sources (e.g., protected device 130) to storage devices, such as backup storage 120. This storage may be embodied as local storage, network storage, or virtual storage devices in which any number of virtual machines (VMs) or virtual centers may be provided to serve as backup targets. The data sourced by the data source may be any appropriate data, such as database data that is part of a database management system, and the data may reside on one or more hard drives for the database (s) in a variety of formats.

The server and client computers (e.g., protected device 130) are coupled directly or indirectly to each other and the storage through network 110, which is typically a cloud network (but may also be a LAN, WAN or other appropriate network). Network 110 provides connectivity to the various systems, components, and resources of system 100, and may be implemented using protocols such as Transmission Control Protocol (TCP) and/or Internet Protocol (IP), well known in the relevant arts. In a cloud computing environment, network 110 represents a network in which applications, servers and data are maintained and provided through a centralized cloud computing platform.

In an embodiment, system 100 may represent a Data Domain Restorer (DDR)-based deduplication storage system, and storage server 102 may be implemented as a DDR Deduplication Storage server provided by EMC Corporation. However, other similar backup and storage systems are also possible. Such a system may provide support for various storage architectures such as storage area network (SAN), Network-attached Storage (NAS), or Direct-attached Storage (DAS) that make use of large-scale network accessible storage devices for storage 120. Data Domain is an example of a purpose-built backup appliance providing streaming deduplication that is able to ingest data at full network speeds, from multiple backup sources while providing storage efficiency.

The Data Domain File System (DDFS) is an inline data deduplication file system. As data gets written to the file system, DDFS breaks it into variable sized segments and a group of segments are packed in a compression region. A number of compression regions are grouped together and written as a container to disk. DDFS calculates fingerprint signatures for each segment using SHA1 algorithm. DDFS has an on-disk fingerprint index table, which maps the fingerprint to the container-ID, that has the corresponding segment data. The container has a metadata section followed by several data sections. The data sections store the compression regions; and the container metadata section stores the meta information of the container, i.e., it stores the total number of compression regions, the total number of segments, the fingerprint of each segment, and so on.

In a deduplicated file-system that forms segments from data, these segments are uniquely identified by their key/label called as fingerprint. Given a file offset and length, the corresponding data segment fingerprints need to be looked up. To provide faster offset to fingerprint lookup the mapping is stored in a Merkle tree format where the leaf nodes represent data segments and their fingerprints are stored in the parent nodes which are metadata segments. In a Merkle tree, every non-leaf node is labeled with the hash of the labels of its children nodes to allow efficient and secure verification of the contents of large data structures.

A fingerprint is thus a compact representation of the actual data (or segment). The data (or segment) is passed through a SHA-1 (Secure Hash Function) cryptographic hash function to produce a hash value that comprises the fingerprint. Each unique data segment will generate a unique fingerprint (e.g., 20 bytes in size) and this fingerprint is used to index and get the actual data segment. Basically, the fingerprint is a compact representation of the actual data, and is used to deduplicate the data ingested into the file system.

A file in DDFS is represented by a Merkle tree, with user data as variable sized segments at the bottom level of the tree, referred to as L0 segments. The SHA1 fingerprints of those segments are grouped together at the next higher level of the tree to form new segments, referred to as L1 segments. SHA1 fingerprints of L1 segments are grouped together as L2 segments, and this continues up to L6 which represents the entire file. The top segment of the tree is always an L6 segment, even though it may refer to any lower numbered segments. Segments above L0 are referred to as Lp chunks. The L6 segment of every file is stored in a namespace which is represented as a B+ Tree. The L0 and Lp segments are written to separate containers, known as L0 and Lp containers.

Figure 2:
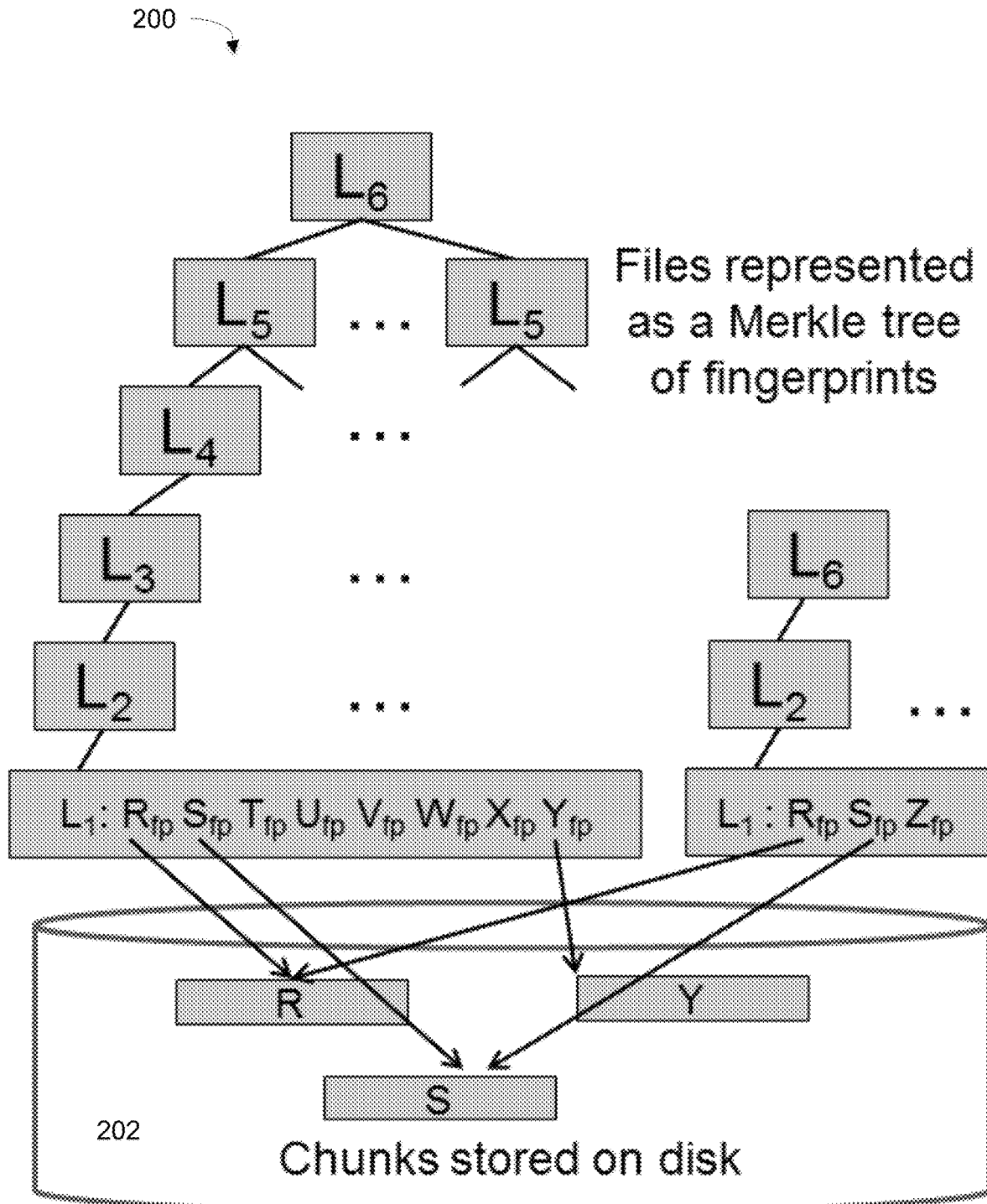
FIG. 2 illustrates an example Merkle tree representation of files in a deduplication backup system, under some embodiments.

FIG. 2 illustrates an example Merkle tree representation of files in a deduplication backup system, under some embodiments. As shown in FIG. 2, Merkle tree 200 comprises layers L0 to L6. The chunks directly written to disk 202 are referred to as $L_0$, meaning the lowest level of the tree. Consecutive $L_0$ chunks are referenced with an array of fingerprints by an $L_1$ chunk, which itself is identified by a fingerprint. An array of $L_1$ fingerprints is referenced by an $L_2$ chunk, continuing to the root of the tree; the root is always labeled $L_6$ for convenience, even if the file is small enough not to need intermediate nodes such as the example on the right side of the figure. The $L_1$-$L_6$ chunks are referred to as $L_p$ chunks, where p is a parameter that ranges from 1 to 6 and indicates metadata representing the file. Deduplication takes place because a chunk can be referenced multiple times. The file system is a forest of Merkle trees, but these trees are not disjoint, particularly at the lowest level. In general, $L_p$ chunks are themselves stored on disk in containers, which include a relatively small (hundreds of KB) metadata section with a list of fingerprints for the chunks within the container. Thus, they may be read more quickly than the full container.

In a DDFS system, as data is ingested to the filesystem, the system anchors and segments the data. The fingerprints for the data are then computed using a hashing method. These fingerprints are looked up in a big hash table (index), and if the fingerprints do not exist, the segments would be compressed and encrypted and packed into compression regions. The compression regions are sandwiched in turn, into a data structure called the containers. A file is a logical list of fingerprints. When the file is read, the fingerprints are looked up, and the container and the compression region corresponding to the fingerprint are brought into memory, decrypted, de-compressed and read. The buffer is then returned to the upper layers of the filesystem, and finally to the application request.

Figure 3:
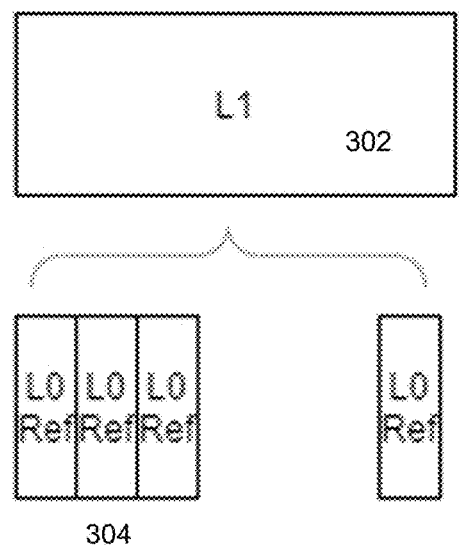
FIG. 3 illustrates an L1 segment referenced by multiple fingerprints (L0 references), in an example embodiment.

As shown in FIG. 2, the filesystem organizes the list of fingerprints associated with a file in a Merkle tree 200. This allows for easy access to a certain offset. The L1 segment is a list of L0 refs or fingerprints which are sandwiched together. Each L0 reference (fingerprint) points to data. This is illustrated in FIG. 3, which illustrates an L1 segment 302 referenced by multiple L0 refs 304, in an example embodiment.

Figure 4:
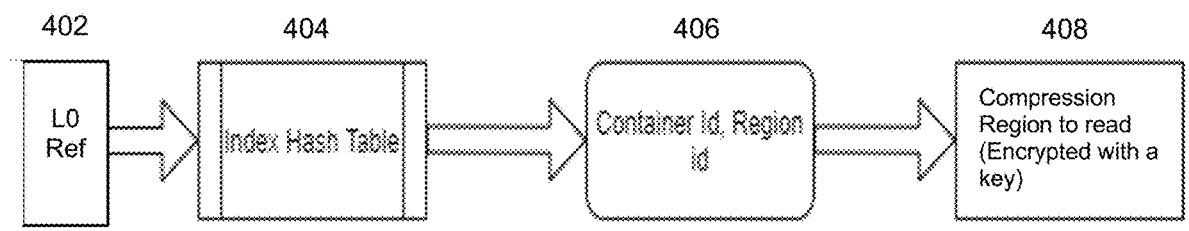
FIG. 4 illustrates an L0 reference accessing an index hash table that provides a container ID and region ID that accesses compression region, under some embodiments.

To access the data, the fingerprint must be looked up using the index, which would return the container ID and the region ID within the container. The compression region metadata holds the key ID, which is then used to read the encrypted key to decrypt the compression region. This is illustrated in FIG. 4, which illustrates an L0 ref 402 accessing an index hash table 404 that provides a container ID and region ID that accesses compression region 406.

In a deduplication backup system that comprises a backup client (protected device) and a storage server, such as shown in FIG. 1, the protected data 138 can be split into variable size segments. A fingerprint can be generated for each segment, and these fingerprints can then be grouped to form a group fingerprint.

In an embodiment, the backup system 100 uses the client-based persistent cache 136 to identify duplicate group fingerprints and create virtual copies when these duplicates are detected. For this embodiment, the group fingerprints used on the backup client to identify duplicate data are not persisted on the backup client 130 but are instead retrieved from the storage server 102 during the backup process on an on demand basis. The specific group fingerprints sent are based on knowledge of previous backups of the asset, either learned or provided as a hint from the backup application. Once it is known that a specific group fingerprint is present on the server, a virtual synthetic request can be generated instead of a traditional deduplication process. The hint represents a workflow insight that is gained through a working partnership between the client and server to leverage the hint to identify a good set of group fingerprints to use for comparison. Such a hint may generally consist of backup location information, such as filename and path or other identifying information about one or more previous backups.

In system 100, the segments, fingerprints and the group fingerprints are all stored in storage server 102. Embodiments of system 100 also include a group fingerprint (GFP) retrieval process that provides the ability to fetch the group fingerprints from the storage server based on workflow insights either provided by the application or that are learned. The backup client 130 can then perform inline deduplication based on the group fingerprints after fetching them from the storage server.

Figure 5:
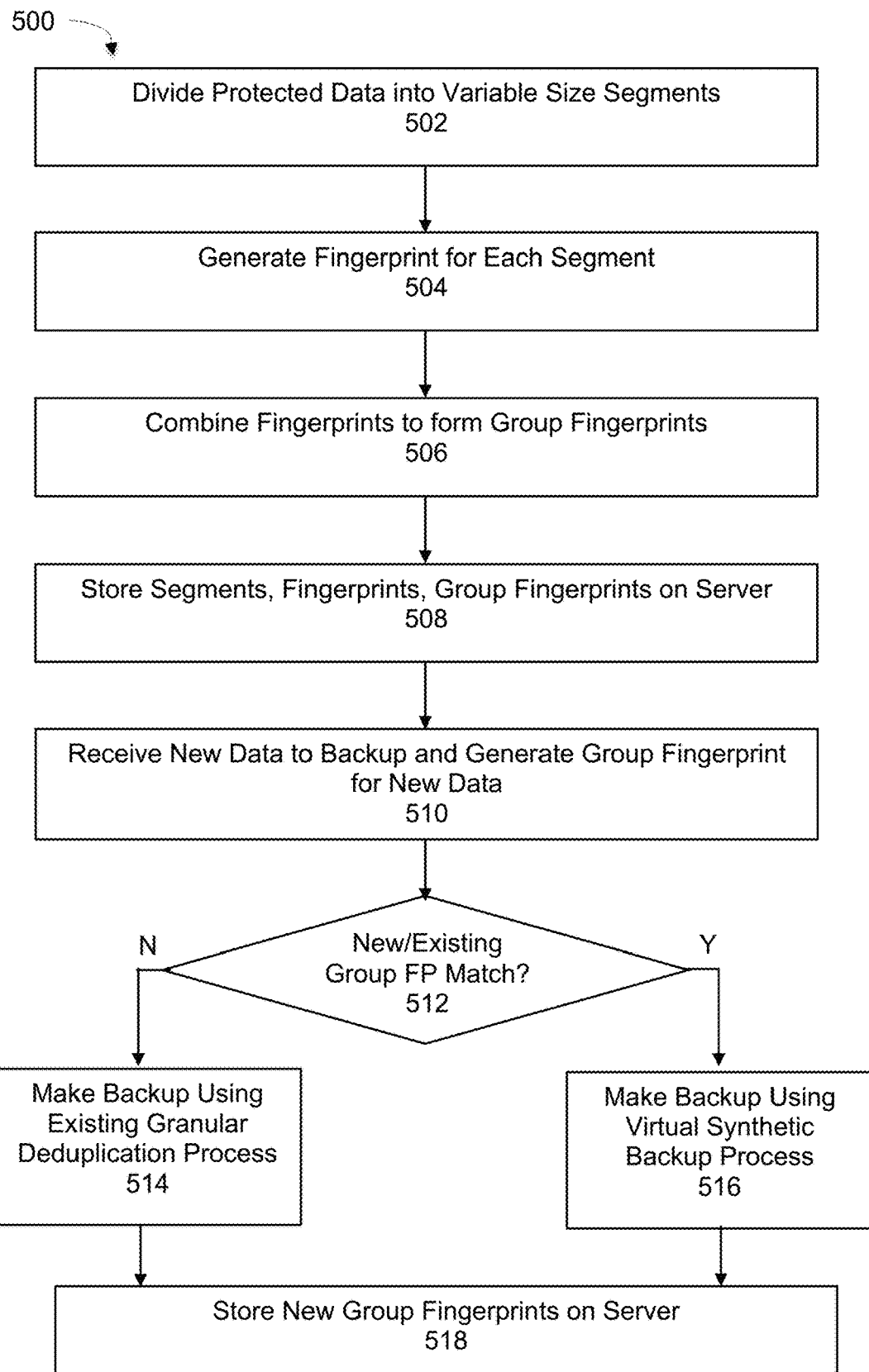
FIG. 5 is a flowchart illustrating an overall method of using a client-side cache for retrieving group fingerprints from a server for deduplication backups, under some embodiments.

FIG. 5 is a flowchart illustrating an overall method of using a client-side cache for retrieving group fingerprints from a server for deduplication backups, under some embodiments. Process 500 starts by dividing the protected data into variable size segments, 502, and generating a fingerprint for each segment, 504. These fingerprints are then combined into groups to form group fingerprints, 506

In these steps, the backup client segments the data to be protected into a plurality of segments, generates a fingerprint for each data segment (or 'segment') and a group fingerprint for a plurality of the fingerprints. The data segments, fingerprints, and group fingerprints are all stored on the storage server, 508.

In response to a backup operation for new data, the backup client compares the group fingerprint it generated for the new data against a list of group fingerprints which were fetched from the protection storage server based on a hint provided by the backup client, 510. It is next determined whether there is a match of these group fingerprints, 512. If a match is detected, this confirms the data corresponding to this group fingerprint is already present on the protection storage server, and this can be leveraged to make the new backup using a virtual synthetic request, 516. If contiguous group fingerprints of new data match, the virtual synthetic request can be combined as a single request. If there are no matches for the new group fingerprints, the process performs the more granular deduplication approach already in place which looks at each fingerprint per segment, 514. The newly generated group fingerprints are also stored in the storage server with an identifier for a previous backup for easy retrieval, 518.

In an embodiment, the backup client will also remember the last pulled group fingerprint offset to know from where to start pulling from next time. This process can also be extended to pull a preset amount of group fingerprints based on the memory resources available on the backup client.

With respect to step 502 of process 500, in some embodiments, an anchoring process already used by a backup client is used to divide the data into segments. For example, if the protected data comprises a file or database, then the anchoring process is used to divide the file or database into multiple segments. In the case of a single stream of data from a single file, a segment includes data from two different objects (e.g., data from a first file and a second file). In some embodiments, the segments generated at step 502 have variable lengths. That is, it is not necessary for the generated segments to have the same length.

For the fingerprint generation, 504, a fingerprint refers to a representative value of a segment which changes when the value of the segment changes. Stated another way, a fingerprint does not change so long as the value of the segment remains the same. In one example, a fingerprint is a hash of the segment. To ensure that the same segment value produces the same fingerprint again if the process repeated again later, in embodiments where a hash is used, the hash is not salted so that the same fingerprint can be repeatedly generated for the same segment value. In some embodiments, a hash already being used by a backup client is used to generate the fingerprint.

As shown in 506, the plurality of fingerprints is grouped into one or more groups of fingerprints. In some embodiments, an anchoring process is used to perform this grouping. In some embodiments, this is a different anchoring process as used in step 502. For example, in some applications it may be desirable to have two anchoring processes that can be tuned independently for different performance goals and/or system characteristics. For example, whereas it is acceptable at step 502 to divide the protected data at any byte, at step 506 the boundaries or divisions should only occur at fingerprint boundaries as opposed to any byte.

In some embodiments, the configurations or settings of an anchoring process (e.g., that control the size of an average or nominal group of fingerprints at step 506) are set based on one or more system or environmental inputs. For example, depending upon the amount of memory allocated for the cache, the amount of protected data, and/or a desired cache hit rate, the size of a group of fingerprints will tend to be larger or smaller. In some embodiments, such environmental or system inputs are obtained when a deduplication backup system is installed. It is noted that once the configurations or settings of an anchoring process are set (e.g., based on available memory, etc.), those configurations are not changed to ensure consistency between backups and avoid unnecessary cache misses.

In step 506 a group fingerprint is generated by combining the segment fingerprints. In some embodiments, a hash is used and the hash may or may not be the same hash as one used at step 504. Like individual segment fingerprints, group fingerprints remain the same so long as the group of fingerprints does not change. If, however, one or more of the fingerprints in the group change, then the value of the group fingerprint changes.

For process 500, steps 502 to 506 may be implemented as a pipeline, that is, they may operate simultaneously on data at different stages in the process.

Process 500 also involves determining if the group fingerprint being processed is stored in a cache. This cache is sometimes referred to herein as a client-side cache or as a cache on a protected device (e.g., for those embodiments where a backup client is running on a protected device). If the process is being performed by a proxy device then the cache may be on the proxy device and not the protected device. If the group fingerprint being processed is stored in the cache, then the group fingerprint being processed is flagged as one for which a virtual copy will be performed.

For purposes of description, a virtual copy is a copy process in which data is not copied from a protected device to a deduplication storage server (e.g., over a network), but is rather identified as data that has already been backed up during a previous backup, for example by identifying that earlier backup, some offset from the beginning of that earlier backup, and a length starting from that offset. Using a virtual copy is faster than transferring the protected data over the network from the protected device to backup storage, so identifying duplicate data and performing virtual copies is desirable.

In general, virtual copies are made only for data of group fingerprints that are stored in the cache. For example, a backup client running on a protected device may send a virtual copy instruction to a deduplication storage server that identifies a data range in the current backup (e.g., identified by an offset and a length from that offset), the previous backup which includes the identical data, and a data range within that previous backup (e.g., identified by an offset and a length from that offset).

In some embodiments, the process can include consolidating two or more group fingerprints (all of which are stored in the cache and all of which are sequential or adjacent to one another such that they can be referenced using a single previous backup, a single offset, and a single length) into a single virtual copy command. Consolidating multiple group fingerprints that are stored in the cache into a single virtual copy command is more efficient, for example, than having multiple virtual copy commands, each of which refers to a smaller amount of data.

As shown in FIG. 5, embodiments of process 500 use group fingerprints in a targeted deduplication method in which the server stores group fingerprints that are retrieved as needed and on demand as part of the backup process. In this manner, group fingerprints that are used for filtering are not populated and persisted in the client-side cache. This improved process, thus removes the need to persist group fingerprints on the backup client during backup, and it removes the need to verify that the group fingerprints stored on the backup client are still present and valid on the server, as well as the need for backup client disk space to persist the group fingerprint cache.

There may be cases where subsequent backups after the first full backup are not performed by the same client machine (e.g., in a proxy environment, like Hadoop). If the system only caches the group fingerprints on the backup client, it can potentially lose the ability to do the targeted deduplication on the following backup. In contrast, persisting the group fingerprints on the storage server itself, rather than the backup client enables this. There may be a cost imposed for saving the group fingerprints on the storage server, but this is easily offset by the reduced cost for the representation of L0 FP chain when part of the backups are converted to virtual synthetic backups.

Figure 6:
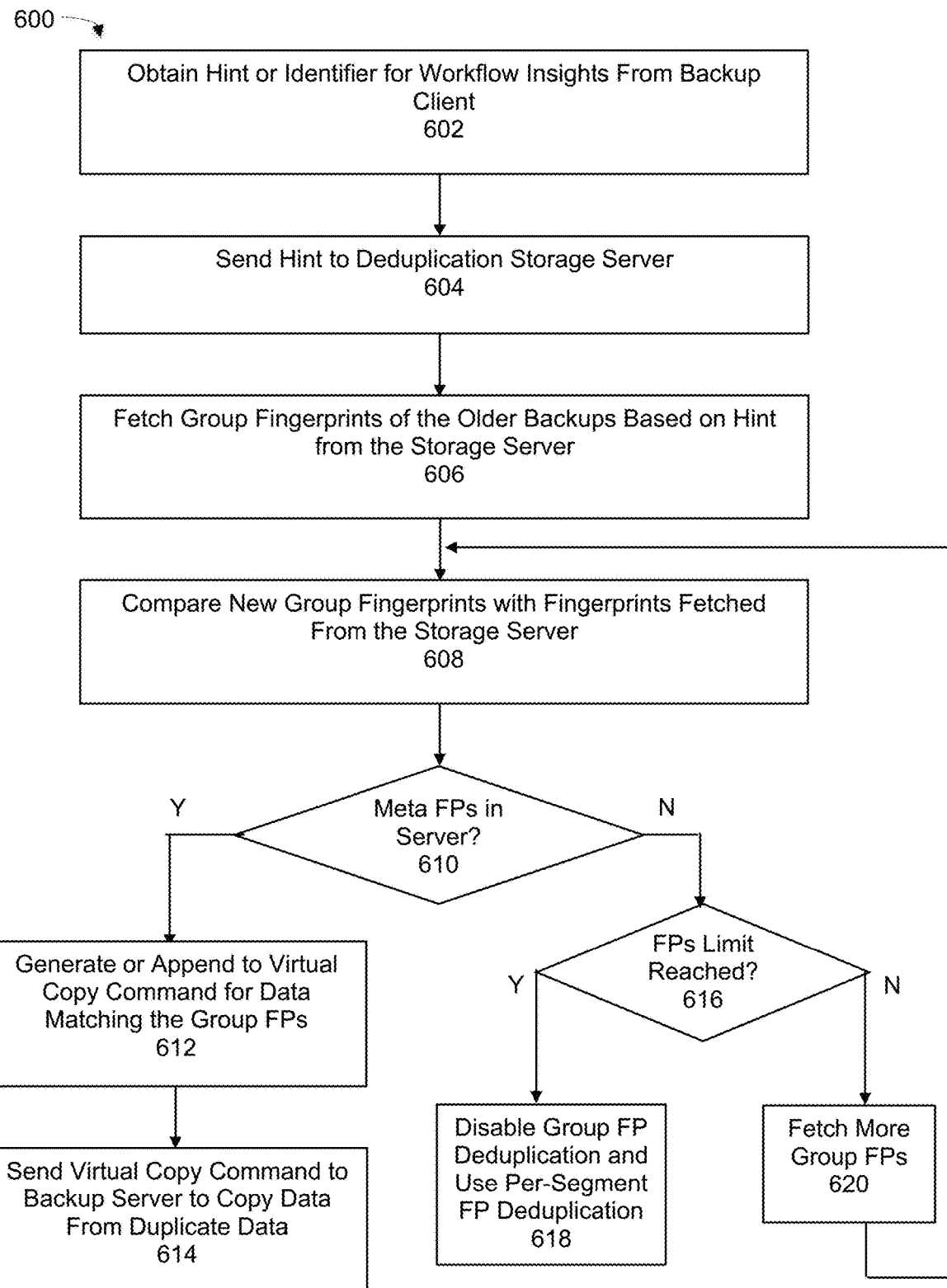
FIG. 6 is a flowchart that illustrates a method of performing targeted deduplication using server-side group fingerprints, under some embodiments.

FIG. 6 is a flowchart that illustrates a method of performing targeted deduplication using server-side group fingerprints, under some embodiments. Process 600 of FIG. 6 starts with obtaining a hint or identifier for workflow insights from the backup client, 602. A hint may be a filename (/path/filename.xxx) of a previous backup of the same asset, a directory name where the previous backups reside, the hostname of the storage server, or any other similar location or identification of a previous backup involving the file.

These hints are then sent to the deduplication storage server, 604. Based on these hints, group fingerprints of older backups are fetched from the server, 606. Upon receipt of new group fingerprints for a new backup operation, the process compares the new group fingerprints with the group fingerprints fetched from the server, 608.

In decision step 610, it is determined whether or not the new FPs (fingerprint metadata) are present in the server. If so, the process generates or appends to the virtual copy command for the data matching the group fingerprints, 612. With respect to this appending step, The virtual copy command represents a contiguous set of data that can be synthesized from a file already on the system. If the FP is identified as a duplicate and a virtual synthetic command is already being created based on the previous data also being duplicated, it will append to this command. That is, it will extend the length in the virtual copy command to include this additional section of data as well. The virtual copy command is then sent to the storage server to virtually copy the existing data, that is data that is already present in storage, 614.

If, in step 610, it is determined that there is no match between the new group fingerprints and the fetched (old) fingerprints, the process next determines whether or not a defined limit for fetching new fingerprints has been reached, 616. If not, more fingerprints are fetched for comparison until such a limit is reached, 620. If the fingerprint limit is reached, the process disables the group fingerprint deduplication and uses a traditional per-segment fingerprint based deduplication backup, 618.

In the traditional deduplication workflow, 618 all fingerprints are sent to the backup appliance for filtering, whereas in the targeted deduplication case, 614, only the group fingerprints are retrieved and used for the filtering. Only data associated with those group fingerprints that are not known to the system need to be transferred using the traditional deduplication method, as shown in the sequence of decisions leading to step 618 versus step 614.

At the conclusion of the targeted deduplication backup case, a backup recipe is available made up of the virtual copy commands along with the offset and length of new data written. This recipe can be used to optimize replication (e.g., using a virtual synthetic restore feature) and supports the cyber recovery capability of only identifying and scanning newly written data.

Figure 7:
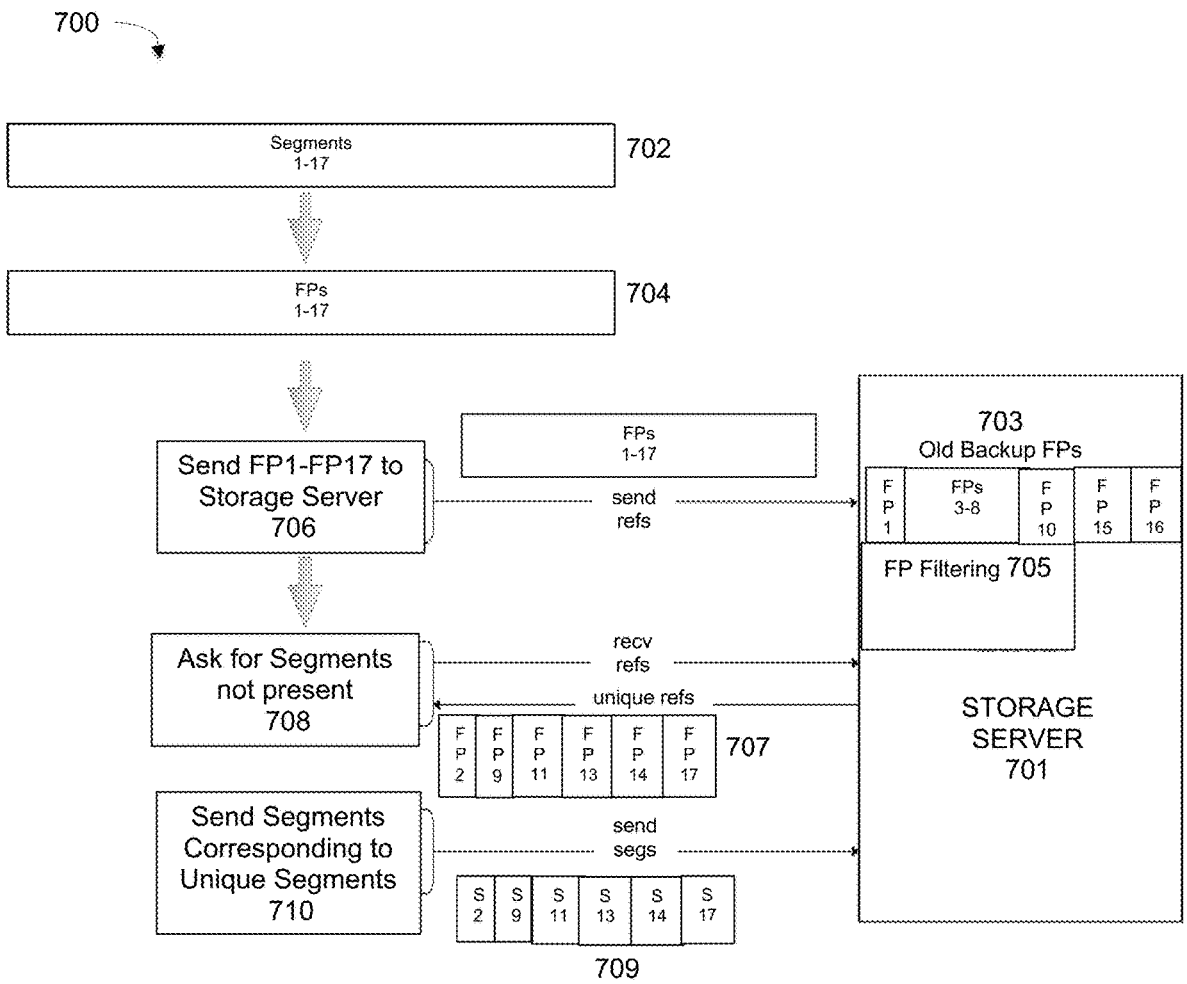
FIG. 7 is a diagram that illustrates a per-segment deduplication backup process, under some embodiments.

FIG. 7 is a diagram that illustrates a per-segment deduplication backup process, under some embodiments. As shown in diagram 700, a number (17) of segments 702, denoted S1 to S17, are provided for backup by storage server 701. A corresponding fingerprint (FP) 704 is generated for each segment resulting in 17 fingerprints (FP1 to FP17) as shown for this example. These fingerprints are then sent to the storage server 701 by process 706. The storage server 703 contains some fingerprints from one or more previous backups, and then fingerprint filtering component 705 compares the new fingerprints 704 to these old backup fingerprints 703. This filtering process results in a list of missing fingerprints, which identify segments not present for step 708. In this example, FPs 2, 9, 11, 13, 14, and 17 are not matched between new set 704 (FP1 to FP17 inclusive) and old FP set 703 (FP1, 3-8, 10, 12, 15-16).

The storage server 701 then indicates that the unique references corresponding to the missing fingerprints 707 are needed. The backup client then sends the segments corresponding to the unique fingerprints 707 identified as not matching, in step 710. For this example, the corresponding segments 709 are S2, S9, S11, S13, S14, and S17. These segments are then copied by the present backup operation, while the segments corresponding to the matching fingerprints are not stored, as this data already exists on the storage server 701. For the backup processing described herein, the system or computer sending the backup data represents a client system, and thus, in FIG. 7, processes 706, 708, and 710 are performed by a backup client.

In an embodiment, this process 700 is the normal per-segment deduplication process performed in step 618 of FIG. 6. Embodiments of the group fingerprint retrieval process 122 of system 100 enhance this deduplication process by adding certain group fingerprint (GFP) process steps.

Figure 8:
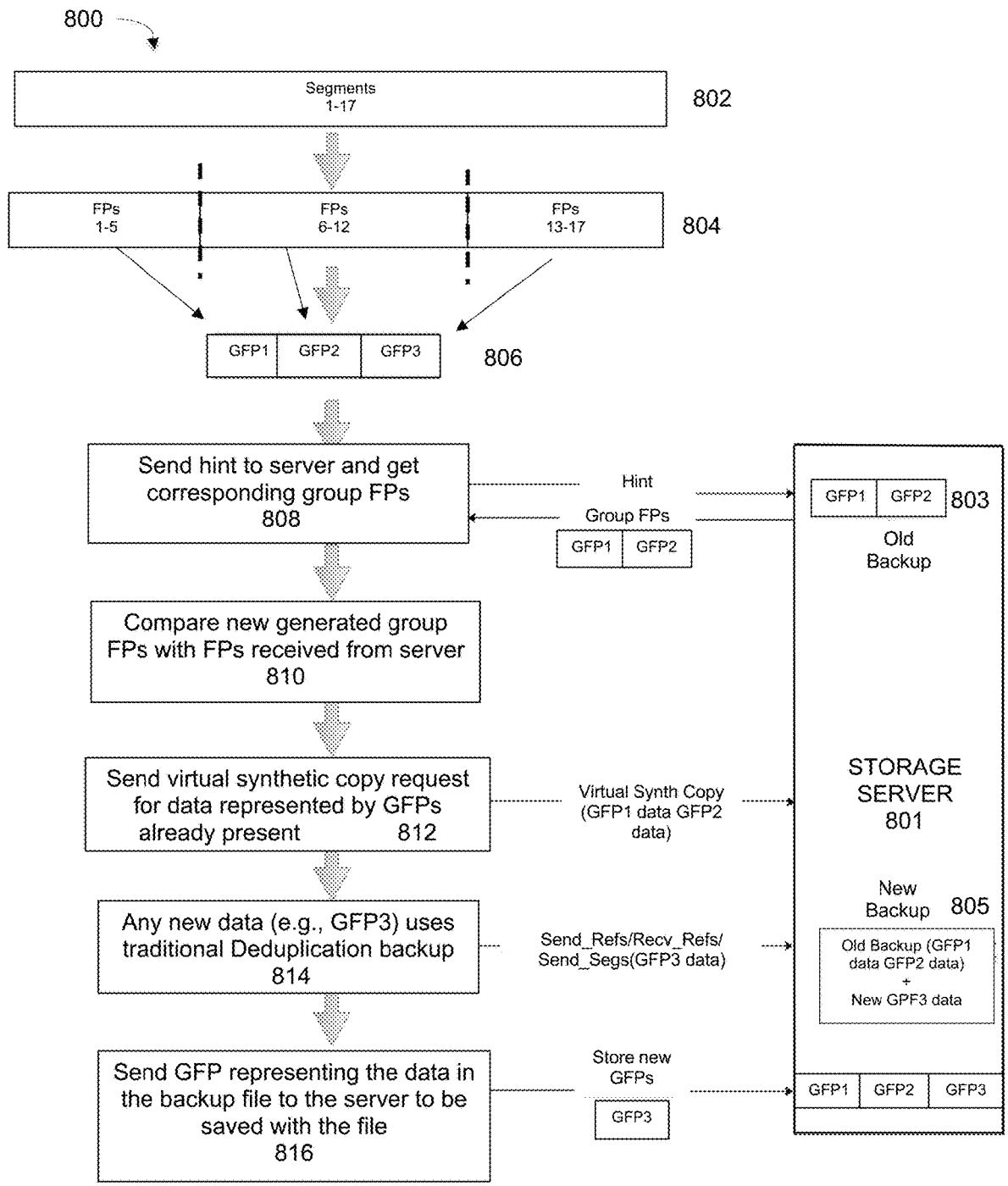
FIG. 8 is a diagram that illustrates a targeted deduplication backup process using server-side group fingerprints, under some embodiments.

FIG. 8 is a diagram that illustrates a targeted deduplication backup process using server-side group fingerprints, under some embodiments. As shown in diagram 800, a number (17) of segments 802, denoted S1 to S17, are provided for backup by storage server 801. A corresponding fingerprint (FP) 804 is generated for each segment resulting in 17 fingerprints (FP1 to FP17) as shown for this example. These fingerprints are then grouped into respective groups 806. For the example shown the 17 fingerprints are divided into three similarly-sized groups of fingerprints each, resulting in group fingerprints 1, 2, and 3, denoted GFP1, GFP2, and GFP3, as shown. The grouping can be done in any appropriate manner and can result in equal or unequal size groups.

In step 808, the backup client sends the workflow insight (hint) to the storage server 801 and receives back corresponding group fingerprints for an old backup, 803. For this example, the group fingerprints are GFP1 and GFP2. For this example, it is assumed that the storage server 801 contains some fingerprints from one or more previous backups that have been grouped, and the backup client compares new fingerprint groups 806 to these old backup group fingerprints 803 that were received back from the server, step 810. This comparison results in a list of matching fingerprint groups (e.g., GFP1 and GFP2), which identify segments already stored in the storage server for the present backup set. The backup client then sends a virtual synthetic copy request for data represented by group fingerprints as already present in the server, step 812. Any group fingerprints not matching represent new segments that were not previously stored. Any such new data, in this case segments for GFP3) are backed up to storage server 801 using traditional per-segment backups, such as process 700 of FIG. 7, step 814. The fingerprints and segments for the new data are sent to the storage server, which then performs a new backup operation 805, which combines the old backup data segments (e.g., corresponding to GFP1, GFP2) with the new data segments (e.g., corresponding to GFP3). The new data segment group fingerprints (GFP3) are then stored in the storage server for use as the 'old' backup data for the next backup cycle. Step 816 thus comprises sending the GFP representing the data in the backup file to the storage server to be saved along with the file itself.

At the time of replication, if the backup file was generated using a specific sequence of steps referred to as a 'recipe,' the replication logic will attempt to replay it to generate the same backup file on the target. Thus, an old backup combination that is combined with the new backup data comprises a 'recipe' that is created.

For the example of FIG. 8, the segments corresponding to GFP1 and GFP2, which were present in the old backup 803 are the recipe for the current backup adding GFP2. Thus the recipe in this example case corresponds to:

Current Backup=(Old Backup: offset region represented by GFP1 and GFP2)+(data represented by GFP3).

In this simple example, assume Old_Backup was already on the target system, so to create the new backup file on the target, the replication code would simply issue a synthesis operation to synthesize the data represented by GFP1 and GFP2 of the Old_Backup to the new file, and then send the data associated with GFP3. Thus illustrating the use of the recipe in this case.

Embodiments of the targeted deduplication process retrieve the relevant group fingerprints from the protection storage server using a hint instead of maintaining them in a cache on the backup client. These group fingerprints can be fetched based on a client identifier which can be a backup client name or IP, the previous backup from the same backup client, or a specific hint given to the backup client by the backup application. A separate application program interface (API) to get these group fingerprints can be used and this can allow the storage server to get more group fingerprints as needed. Such a solution is ideal for environments where the bulk of the deduplication logic resides on the storage server and the fingerprint metadata is accessible from a high throughput store. This method improves on persistent client-side cache approaches in that this method does not require the system remembering previous backup's group fingerprints in the cache (limited by size) and can fetch the relevant group fingerprints from the storage server instead.

The targeted deduplication process 800 can apply virtual synthetics to many backups or applications protecting any type of data. It does not require application intelligence to drive the synthesis. It also allows the process of finding what segments are new to be shifted from the deduplication storage server to the backup client freeing up compute resources on the server, without the need of a client-side cache. Since synthetics is used there is the potential for metadata storage savings. The process further enables the benefits of targeted deduplication to be realized in proxy environments as the client cache is not required. The process also saves network bandwidth and the performance overhead of polling for filtering results. It also enables the creation of backup recipes, and in turn enables features that make use of these recipes (e.g., virtual synthetic replication, and cyber recovery diffing method to identify only new data written for the purposes of security scanning).

In an embodiment, the deduplication backup process executed by a data storage server running a Data Domain file system (DDFS) and including a Data Domain Bandwidth Optimized Open Storage Technology (DDBoost) library that links with the application to reduce bandwidth required for data ingests, and which translates application read and write request to DDBoost application program interfaces (APIs). For this embodiment, the targeted deduplication process provides the ability for deduplication management to be performed within the client-side DDBoost stack without the DDBoost needing access to the backup client's disk.

As stated above, embodiments of the targeted deduplication process generally saves network bandwidth over present methods, but there may be some added overhead in server storage. Generally this a trade-off as the group fingerprints generated by the backup client are stored in the storage server, which needs some storage space. For example if for a terabyte of gen0 data to be backed up, it will need the following amount of storage for storing the group fingerprints: if there is a group fingerprint to span 256 KB of data (meaning a group fingerprint covering about 32 L0 segments of average size 8 KB), then the system would need four group fingerprints to cover 1 MB of data; so for 1 TB, it would need 1024*1024*4=4M group fingerprints. Considering each group fingerprint has a size of 40 bytes, this would need 160 MB of storage space to cover for a 1 TB file which is 0.015% of the total data that was backed up.

It should be noted that, for storage efficiency the group fingerprints can be removed as files age and only remain on the most recent backups. Assuming that it is possible to deduplicate 25% of a first generation (gen1) backup using these group fingerprints and targeted deduplication and convert them to synthetic writes, it is not necessary to send the corresponding L0 fingerprint traffic over the network as with traditional deduplication. Therefore, the network bandwidth savings is obtained for a fraction of the storage costs. Assuming 24 byte L0 fingerprints and an average 8 KB L0 span, the system will need 250*1024*128*24=750 MB of L0 data transferred across the wire (for 25% or 250 GB of a 1 TB backup). For one Petabyte (PB) of data, it would need 4G (4*1024*1024*1024) group fingerprints which is 160 GB of storage space on the storage server. Again, roughly assuming a 25% conversion rate of traditional deduplication into virtual synthetics, the system can save network bandwidth by eliminating the need to send 750 GB of L0 metadata over the network.

Through the embodiment described above with respect to FIG. 8, GFPs are now stored on the storage serer instead of in the backup client cache. The GFPs calculated on the backup client are sent to the storage server for storage as part of the targeted-deduplication process. In this case, the storage server simply stores the GFP's, it does not manage the lifecycle of the GFPs.

Server Generated Group Fingerprints

Generating backups using synthesis, where the backup is formed by reusing the unchanged chunks from older generations, has advantages in terms of network bandwidth savings resulting from not needing to resend all the segments. It also saves critical compute resources by freeing them up from needing to segment and fingerprint all the data again. The synthetic workflow is also used when replicating a backup copy to another storage server. The use of group fingerprints to achieve synthesis as described above allows many backup types that cannot track the changed chunks between backups to also benefit from synthetic backups.

Embodiments described above are directed at using group fingerprints to create virtual-synthetic backups. Such group fingerprints are generated on the backup client and stored on the storage server and reference the backup client that has generated them to benefit all backup environments (proxy, etc.).

An alternative embodiment provides a system that auto-generates and persists the group fingerprints for the backups which are already on the storage server, thus enabling the backup client to fetch these fingerprints using an identifier and enforce synthesis for the new backup or replication copy against any previously written backup.

In this alternative embodiment, the group fingerprints are generated on the storage server itself, rather than being generated on and pushed from the backup client for mere storage on the storage server. Thus, rather than have group fingerprints merely stored on the storage server, as files are ingested, the storage server also auto-generates group fingerprints on its own.

The group fingerprints can be generated inline as and when it accumulates the required number of L0 fingerprints. All of these group fingerprints can then be stored along with the segment tree for that file, where the fingerprint segment tree of a file can be enumerated using the same logic used for garbage collection.

The formation of these group fingerprints for files already present on the storage server can be done during the idle time of the storage server, or it can be done on demand from the client. For example, if the client wants the group fingerprints of a previously written backup, it can trigger the formation of the group fingerprints and fetch those same fingerprints to do the GFP-based deduplication.

The advantage with this method is that the backup client can use any existing copy of a previous backup to get the group fingerprints, essentially using any of the previous backup copies as base files to convert the current backup to a synthetic backup. When the original file is deleted, these group fingerprints can also be deleted.

In an embodiment, the GFP auto-generation process performed by the storage server can also be controlled by a policy or attribute set on the file or directory tree (Mtree). Such an attribute can be set at create time and a cron job (or similar mechanism) can be used to asynchronously generate and store these group fingerprints.

Figure 9:
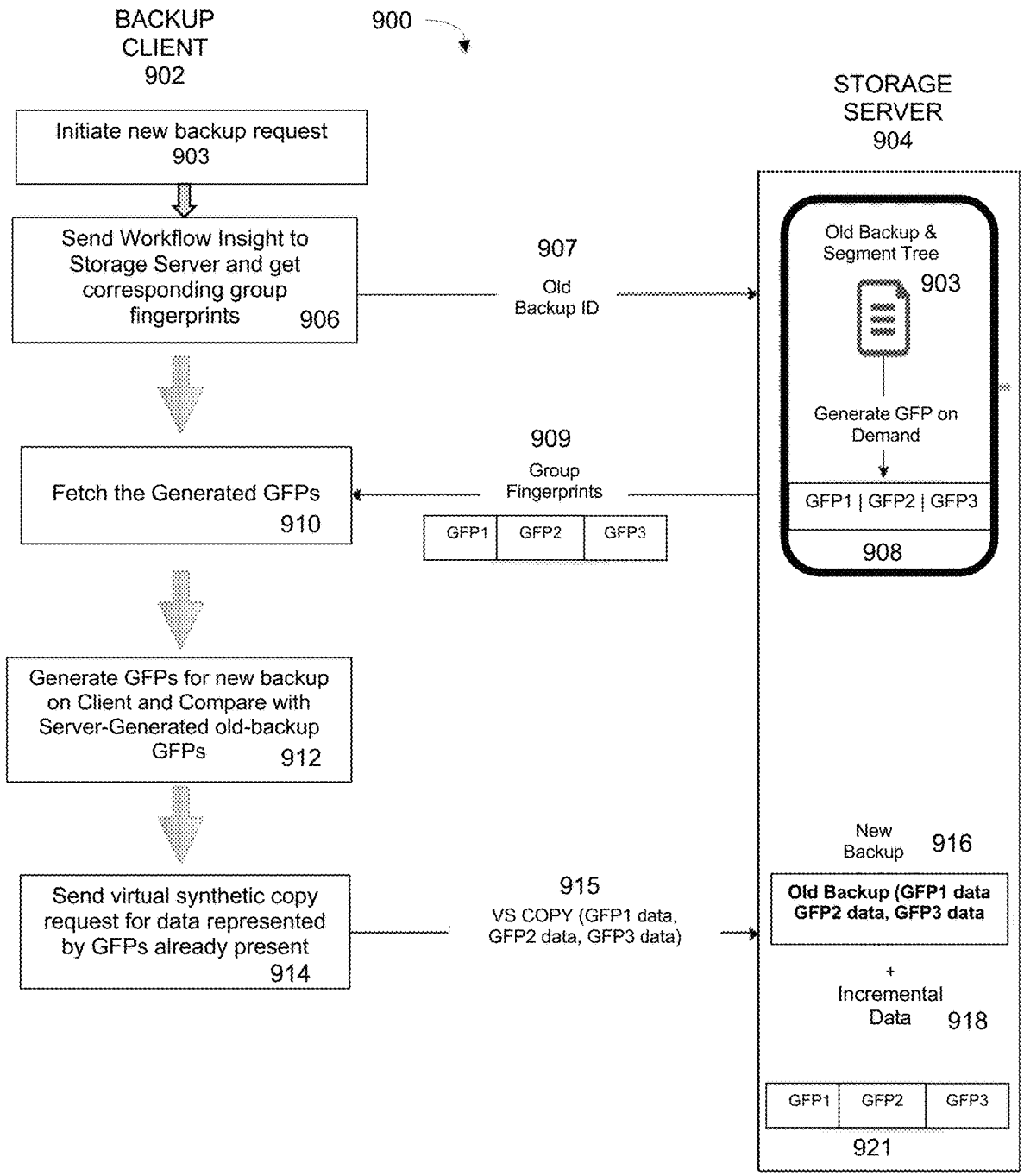
FIG. 9 is a diagram illustrating an overall method and system components for generating group fingerprints on a server for deduplication backups, under some embodiments.

FIG. 9 is a diagram illustrating an overall method and system components for generating group fingerprints on a storage server for deduplication backups, under some embodiments. Diagram 900 illustrates the interaction between a backup client 902 and a storage server 904 to make a synthetic backup of client data using group fingerprints (denoted GFP1, GFP2, GFP3). In this process, upon initiation 903 of a new backup from the backup client 902, the backup client sends a workflow insight in the form of an old backup ID 907 to the storage server 904 to get corresponding group fingerprints for the old backup 909 from the storage server. The storage server 904 processes the old backup ID 907 in process 908 to generate these group fingerprints 909. In an embodiment, process 908 comprises finding the old backup and segment tree 903 from the old backup ID 907, deriving the individual segment fingerprints, and then generating the group fingerprints 909 on demand for return back to the backup client 902.

In process 908, when the storage server 904 receives the workflow insight (e.g., old backup ID) 907 from the backup client 902, it uses this insight to locate the relevant previous backup or backups ("old backup") pertaining and the corresponding fingerprint segment trees 903. The fingerprint segment tree is then scanned to obtain the list of fingerprints 703, as shown in FIG. 7. The group fingerprints 908 are generated on demand and are calculated using a consistent algorithm used by both the backup client 902 and storage server 904.

Once the group fingerprints (GFPs) 909 are generated in the storage server 904, they are fetched 910 by the backup client 902. The backup client compares group fingerprints for the new backup with the group fingerprints from the old backup to determine if any group fingerprints match, 912. If any GFPs match, the backup client then sends a virtual synthetic copy request for data represented by group fingerprints that match (i.e., are already present from the old backup), 914. As shown in FIG. 9, the backup client 902 sends the virtual synthetic (VS) copy 915 for GFP1 data, GFP2 data, and GFP3 data, for example. The storage server 904 then creates a new backup 916 by adding the old backup data for these GFPs with any new incremental data 918. In an embodiment, the data element of [Old Backup (GFP1 data, GFP2 data, GFP3 data)] is referred to as a 'recipe.'

Figure 10:
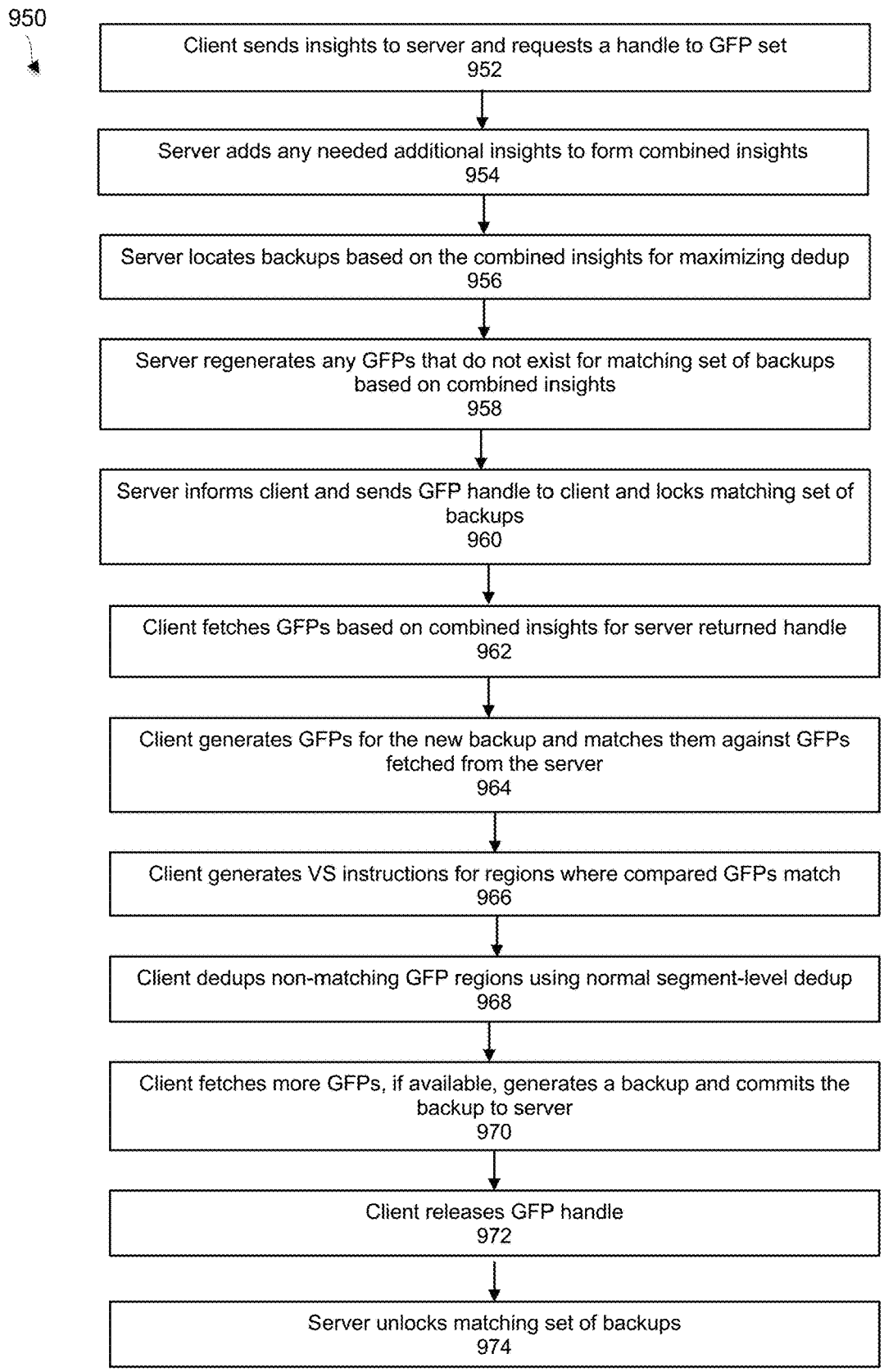
FIG. 10 is a flowchart that illustrates a process of generating group fingerprints on a storage server for deduplication backups, under some embodiments.

FIG. 10 is a flowchart that illustrates a process of generating group fingerprints on a storage server for deduplication backups, under some embodiments. In step 952, the backup client 902 sends insights 907 to the storage server 904 and requests a handle to the GFP set 908. The storage server then adds additional insights so that the client provided insights to form combined insights, 954. The additional insights can be any information not provided by the backup client, but that are deducible by the storage server itself, such as a backup connection from a specific source, a data type, and so on. If the backup client provides sufficient information, there are usually no additional insights required by the storage server, but such additional information may be helpful to narrow down or expand the datasets or files for backup.

The client insights and optional server insights help the storage server locate one or more backups that may contain one or more files, and the server communicates the GFPs for these backups to the backup client. Thus, the storage server next locates a possible set of one or more backups based on the client-sent insight (and any possible additional insights) and gets the group fingerprints for the old backup. These files are likely to be a good fit for the group fingerprint deduplication that maximize the client's ability to perform deduplication through a virtual synthetic backup, 956, and it does this by locating the backup based on the combined insights, and then sending back to the client the GFPs for this located backup. The storage server 904 has the ability to generate GFPs itself at any time. Thus, if any of the client requested GFPs do not exist for one or more of the matching set of backups based on the combined insights, the storage server regenerates them, 958.

After regenerating any necessary GFPs, the storage server directly or indirectly informs the backup client that the GFPs are available and provides the GFP handle to the backup client, 960. In this step, the storage server also locks the matching set of backups so that they cannot be deleted since the backup client may use any of them for the virtual synthetic backup operation.

In step 962, the backup client now begins the deduplication backup operation by first fetching the entire or partial set of GFP from the GFP set that was created based on the combined client and server insights, and for which the handle was returned in step 960. The backup client next generates the GFPs for the new backup and compares them for matches against the GFPs that were fetched from the storage server, 964. The backup client then generates virtual synthetic backup instructions for regions where the compared client-generated GFPs and the fetched GFPs, 966. In the case where there are regions where the generated and fetched GFPs do not match, the backup client deduplicates these non-matching regions using traditional segment-level deduplication, 968.

The backup client then fetches more server-side GFPs if it is running in partial fetch mode, and generates a backup utilizing the virtual synthetic backup instructions, and commits the backup to the storage server, 970.

The backup client next releases the GFP handle so that the storage server is now free to release the GFPs that it had or generated, 972. The storage server also unlocks the matching set of backups and proceeds with normal operations of data deletion, and so on, 974.

In some cases, the backup client may not release the GFP handle (step 972), in which case an auto timeout and cleanup operation may be triggered, so that the system is not left in a stale state. Optionally, the backup client can send the new GFPs for the new backup back to the storage server, and the storage server itself may save them for the new backup. This, however, is not strictly required since the storage server can generate the new GFPs at any time in the future.

The storage server 904 manages the lifetime of the GFPs that are stored on the server for the new backup. It is free to discard them at any time, since it has the ability to generate them again. The storage server also allows the backup client 902 to request a discard of the existing GFPs associated with any backup. The storage server can act on the request and delete or just discard the request.

As compared to the embodiment of FIG. 8, for system 900 of FIG. 9, the storage server can now autogenerate GFPs for any file instead of the client needing to send them over the network. For this embodiment, the backup client can send the GFPs as an optional step, and if they sent the storage server will use them. If not, the storage server has the capability to autogenerate the GFPs at any time. Any targeted deduplication-capable backup client (i.e., one that can calculate GFPs for new data, do a comparison to identify matches, and issue virtual copy commands) can now utilize the server-resident GFPs for any file to perform targeted deduplication. This enables a backup client to choose what set of GFPs it wants to deduplicate against. The GFPs can be autogenerated for any of the files resident on the storage server, such as NFS ingested or older backups, or backups done using a non-targeted, deduplication-capable client. Additionally, the GFPs can be autogenerated on-demand or during the storage server idle time.

Generating the group fingerprints on the storage server has certain advantages over having them pushed by the backup client to the storage server. First, it eliminates the need to send the group fingerprints from client to server. Since the storage server has the capability to autogenerate the GFPs by scanning the files present on the storage server, the operation of a backup client sending the newly calculated GFPs to the storage server can now be considered optional. If the new GFPs are sent, the storage server will store them. Otherwise, the GFPs can be generated on demand at any time.

Second, it removes the need to always persist the group fingerprints for many backups, thus saving storage space. Since the storage server now can generate the GFPs by itself at any time, this eliminates the need for always persisting these GFPs on the storage server.

Third, the system can generate group fingerprints for any file present on the storage server and use it as a base file for synthetic backups. The backup client can use the GFPs from any file present on the storage server for targeted deduplication. The backup client can choose to ask for GFPs of a specific file, which can then be generated on demand on the storage server. They can then be sent to the client, which can use them for deduplication using the same GFP deduplication process as described above.

Fourth, any backup, such as from a non-GFP-aware client using NFS/traditional Boost client-side deduplication, can now be switched to a virtual synthetic-style backup on the Data Domain Restorer (DDR) side, as opposed to deduplication by L0 style filtering, thus potentially reducing fingerprint metadata. Clients that are not capable of executing client-side deduplication will still send the data fully to the storage server (in case of NFS), or the full data in segment and fingerprint format (in the case of traditional DDBoost deduplication). In both of these cases, if the GFPs for older backups are already present on the storage server, the storage server can now start doing GFP based deduplication and convert the new backups into virtual synthetic backups. In this process, the storage server will calculate the group fingerprints for the newly ingested data and compare them with group fingerprints already existing on the storage server. If the storage server was to do a traditional deduplication using L0 filtering, it would not get this benefit. If the system uses the GFPs, it will be able to deduplicate data at a much coarser level by doing virtual synthetic copies of matching data between the new backup and older backups. Converting the backups to virtual synthetic style backups will also reduce the footprint of the fingerprint metadata that needs to be stored for the new backup, since it now store recipes instead of all the L0/LP metadata.

Fifth, any backup client that has GFP capability can leverage GFPs calculated on the deduplication backup system. When GFPs are present on the storage server and a GFP-enabled backup client finds that the storage server has the GFPs, it can then query the GFPs as needed to perform GFP based deduplication. This allows any future GFP enabled backup clients to benefit from autogenerating GFPs on the storage server.

For the server-generated group fingerprint embodiment described above, such fingerprints can be retrieved during the backup process on demand or an 'as needed' to prevent the need for these fingerprints to be persisted on the server. The specific group fingerprints sent are based on knowledge of previous backups of the asset, either learned or provided as a hint from the backup application, as described with reference to FIG. 6. Once a specific group fingerprint is known to be present on the server, a virtual synthetic request can be generated instead of traditional deduplication backup request.

This on-demand retrieval process for server-stored group fingerprints achieves several benefits, including removing the need to persist group fingerprints on the client during backups, and removing the need to verify that the group fingerprints stored on the client are still present and valid on the server. It also removes the need for client disk space to persist the group fingerprint cache.

There may be certain cases where subsequent backups after the first full will not be done by the same client machine (e.g. proxy environment, like Hadoop), so if the system is only caching the group fingerprints on the client, there might be a loss in the ability to do the targeted deduplication on the following backup. Persisting the group fingerprints on the storage server itself, however, enables this feature.

There may be a cost for saving the group fingerprints on the storage server, but this cost is usually adequately offset by reduced cost for the representation of L0 FP chain when part of the backups are converted to a virtual synthetics. For example, when a full file is written, the metadata associated with the file includes the metadata for any incremental differences (2.5% of incremental) plus the segment tree as there is no Lp sharing. When a file is written in virtual synthetic mode, assuming no shifts, the metadata is only that of the incremental data (2.5%).

Consider an example case of 48 bytes per group FP to reflect the larger blob of data that can be synthesized, and assume there is a 5% change rate for incremental backups. If the source stream is 128 GB, the system would need 512K group FPs to cover this, assuming a GFP spans 256 KiB of data. For the first full backup, the total metadata needed is:

Total Metadata needed=Metadata Full+GFP Storage=128 GB*2.5%+48 Bytes*512K=3.2 GB+~25 MB.

The subsequent backup, if written as a full in DSP mode (5% change) would require:

Total Metadata needed=(incremental size*2.5%)+ ((full size−incremental size)*=160 MB+600 MB=760 MB The subsequent backup, if written using Virtual Synthetics (5% change) would require:

Total Metadata needed=incremental size*2.5%=160 MB (since Lp tree is shared)

For the case where data is not shifting, there is a 600 MB metadata savings through the use of virtual synthetic backup in this case, offsetting the 25 MB of GFP storage. In the case where data is shifting, this same savings would not be realized. It would be additional, however, as it is not necessary to keep group fingerprints forever. It may be desired to keep just one or two copies of the group fingerprints, in which case, the metadata cost reduces even further for the no-shift case and for data that shifts it becomes negligible. Considering the 128 GiB backup example described above, for the scenario where data shifts, if the backup is kept for 30 days the metadata would be 22.8 GB (30*760 MB). The cost of group FPs for two copies is 50 MB, an increase of only 0.2%, yet would yield the benefit of improved performance and optimized synthetic replication.

Auto-Generate Backup Recipes on Server

As described above, incremental backup systems rely on recipes to create backup files, where a recipe comprises a specific sequence of steps used to generate the backup file, and can be expressed such as: [Old Backup (GFP1 data, GFP2 data, GFP3 data)]. A recipe basically lists which GFPs need to be brought forward for the backup. The replication logic of the backup system replays the recipe to generate the same backup file on the backup target so that an old backup combined with new backup data comprises the recipe.

For the server-side group fingerprint embodiment, system 100 includes an auto-generation recipe process 123 that improves upon the system to act on the server resident group fingerprints to autogenerate recipes for server resident files. Such improvement is generally attributable to the backup server only, versus the client, but can still be substantial.

Figure 11:
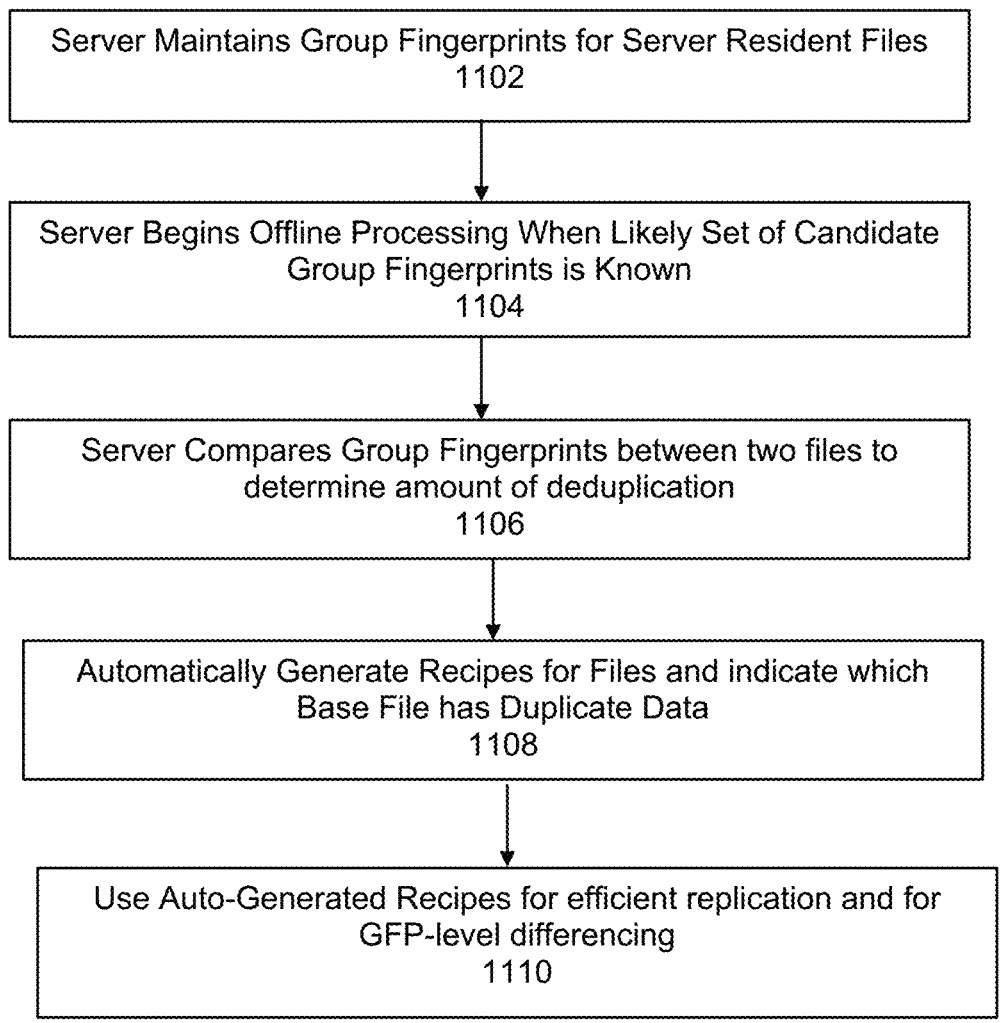
FIG. 11 is a flowchart illustrating a method of auto-generating recipes for server resident files, under some embodiments.

FIG. 11 is a flowchart illustrating a method of auto-generating recipes for server resident files, under some embodiments. In process 1100 of FIG. 11, the server maintains the group FPs for the server resident files, which are either previously existing or generated as needed (e.g., per process 600), step 1102. The server begins the process offline processing once a likely set of candidate group FPs are determined to be known, 1104. The server compares group FPs between two files to find how much each file deduplicates against another, that is, how much duplicate data is present between the two files. 1106. This can be done for files within an MTree or a directory or files with a similar name or some configurable heuristic. After the comparison of GFPs, recipes are autogenerated for the files, and which will indicate which base file, if any, has identical (duplicate) data. 1108. For example, the recipe for File3, can be as follows: Recipe for File3=File1 (GFP1, GFP2)+File2 (GFP3, GFP4).

Such recipes can be used at the time of replication for replicating efficiently. This information can also be used to provide a better and faster differencing process, 1110, and as mentioned above, since the system can now compare GFPs to identify matching regions between files, it can use this to perform differencing at a much coarser level. Group fingerprint differencing is generally easier when generating differences between files that have lot of identical data, but with data shifts.

Figure 12:
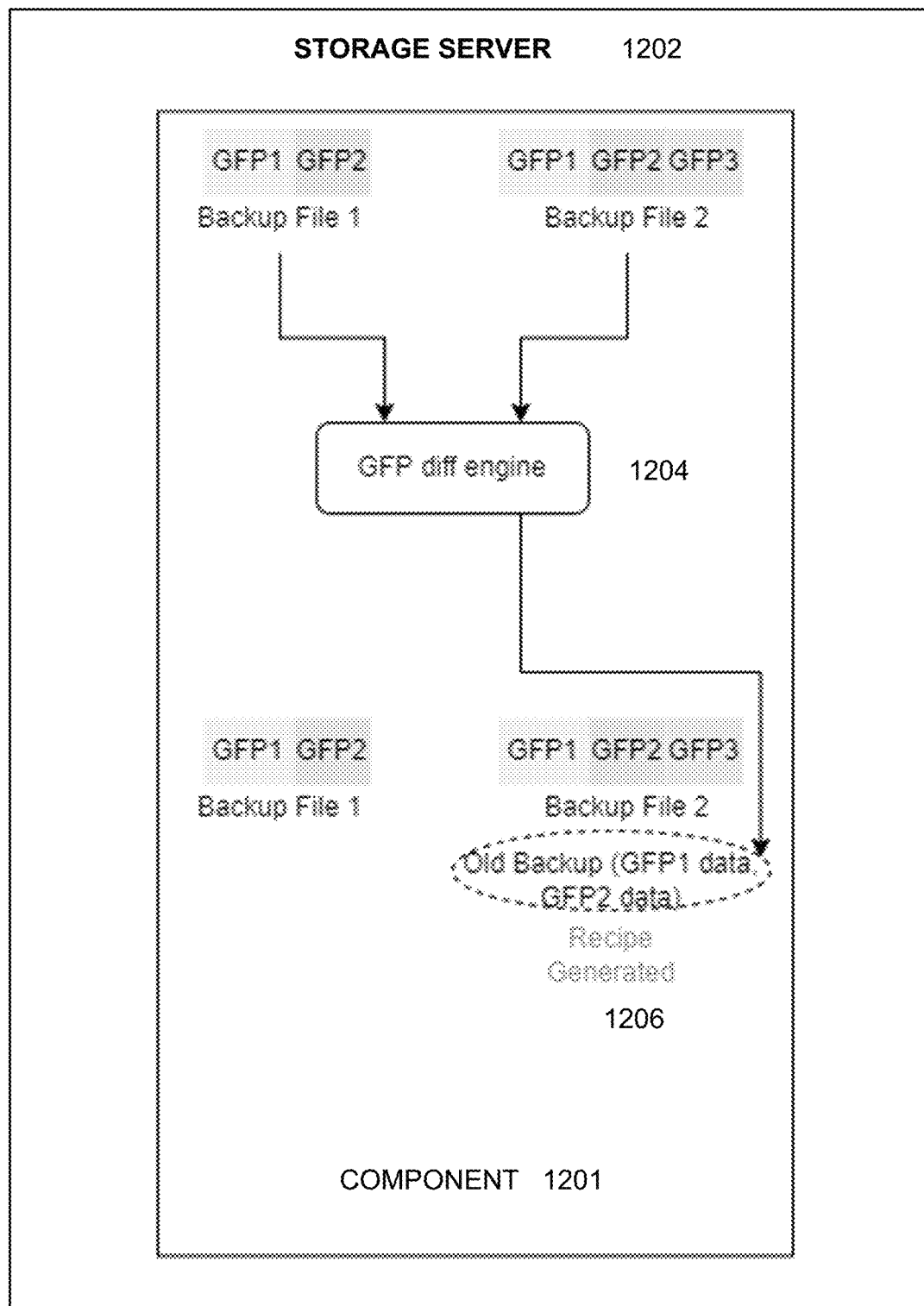
FIG. 12 illustrates a server-side component for automatically generating recipes for server resident, files, under some embodiments.

FIG. 12 illustrates a server-side component for automatically generating recipes for server resident files, under some embodiments. As shown in FIG. 12, storage server 1202 includes a component 1201 that contains, among other elements, a group FP differencing engine 1204. This engine receives the GFPs of pairs of backup files. For the example of FIG. 12, Backup File 1 has GFP1 and GFP2, and Backup File 2 has GFP1, GFP2, and GFP3. For this example, the differencing engine 1204 would determine that GFP1 and GFP2 are duplicated between the backup files, and so the recipe 1206 would comprise new data plus the old backup of GFP1 data and GFP2 data.

For the embodiment of FIG. 12, system 1200, acts on server resident GFPs to autogenerate recipe for server-resident files (only). The server has the GFPs for the server resident files (existing or generated when needed). The GFPs for the files backed up to the storage server would have either come from the client which was doing GFP based deduplication or autogenerated on the storage server after a backup is written. In either case, the storage server has the capability to store GFPs for its backup files. The number of such GFPs stored may be limited by the available storage, so depending on the storage availability, the GFPs can be generated and stored for all the files or some of the files (recent backups for example). In case of limited storage and if there are no GFPs already stored for a specific file, they can always be autogenerated on demand. These GFPs of existing files may be used to identify if a file can serve as a base file for another file.

As shown in step 1104 of FIG. 11, the server begins the process of offline processing once a likely set of candidate GFPs are known. For example, consider a case where a new backup N1 may deduplicate against older existing backups O1, O2 and O3. The backup N1 may have been ingested by a client using any protocol, such as NFS/Boost with traditional FP based deduplication/Boost with GFP based deduplication. It is assumed that the storage server has the GFPs for all the files written to it (O1, O2, O3 and N1), either already stored or generated on demand. In any case of N1 backup using any protocol, the system does not generate a recipe and store it on the storage server. After the N1 backup is done, the storage server tries to compare the GFPs of N1 with O1, O2 and O3 to see if the GFPs deduplicate. When such a possibility is detected, an entry is added to the recipe of N1 indicating that a certain region of backup N1 came from base files O1, O2 or O3. The number of such recipes are directly proportional to the number of such GFP matches between N1 and base files O1, O2 and O3.

It should be noted that recipes are not related to GFP counts, but relate to distinct GFP runs. For the example above, the recipe count is just five but it handles nine GFPs that belong to O1/O2/O3. Basically, each recipe instruction represents a continuous run of GFPs from a specific file.

The storage server can choose the set of base files to compare a specific backup with using some hints (this can either come from the client or be based on a filename or be time-based for picking recent N backups, etc.). For the purpose of description, it is assumed that the storage server has a way to pick the set of potential base files, but embodiments are not so limited.

After the comparison of GFPs, recipes are autogenerated for the files which will say what other file has identical data and thus becoming a base file, as shown in step 1108 of FIG. 11.

To illustrate this case, assume that the files have the following GFPs calculated and stored on the storage server:

| | |
|---|---|
| N1: | GFP13, GFP14, GFP41, GFP22, GFP23, GFP24, GFP33, GFP34, GFP42, GFP35, GFP12 |
| O1: | GFP11, GFP12, GFP13, GFP14, GFP15 |
| O2: | GFP21, GFP22, GFP23, GFP24, GFP25, GFP26 |
| O3: | GFP31, GFP32, GFP33, GFP34, GFP35, GFP36, GFP37 |

Comparing GFPs of N1 with potential base files O1, O2 and O3, the following recipe for N1 is generated:
Recipe for N1:
File O1 (GFP13 data, GFP14 data)+
File O2 (GFP22 data, GFP23 data+GFP24 data)+
File O3 (GFP33 data, GFP34 data)+
File O3 (GFP35 data),
File O1 (GFP12 data).

This means that backup N1 can be formed by referencing some of the data corresponding to certain GFPs from O1, O2 and O3. The actual internal representation of a recipe may look like:
N1, offset 0→copy 'f' bytes from offset 'g' of O1
N1, offset 0+f+a→copy 'h' bytes from offset 'j' of O2
N1, offset 0+f+a+h→copy 'k' bytes from offset 'm' of O3,
N1, offset 0+f+a+h+k+b→copy 'n' bytes from offset 'p' of O3,
N1, offset 0+f+a+h+k+b+n→copy 'q' bytes from offset 'r' of O1
Where:
'f' is the cumulative length of GFP13 and GFP14,
'g' is the offset where GFP13 starts in O1,
'a' is the length of GFP41,
'h' is the cumulative length of GFP22, GFP23 and GFP24,
'j' is the offset where GFP22 starts in O2,
'k' is the cumulative length of GFP33 and GFP34,
'm' is the offset where GFP33 starts in O3,
'b' is the length of GFP42,
'n' is the length of GFP35,
'p' is the offset where GFP35 starts in O3,
'q' is the length of GFP12,
'r' is the offset where GFP12 starts in O1

Figure 13:
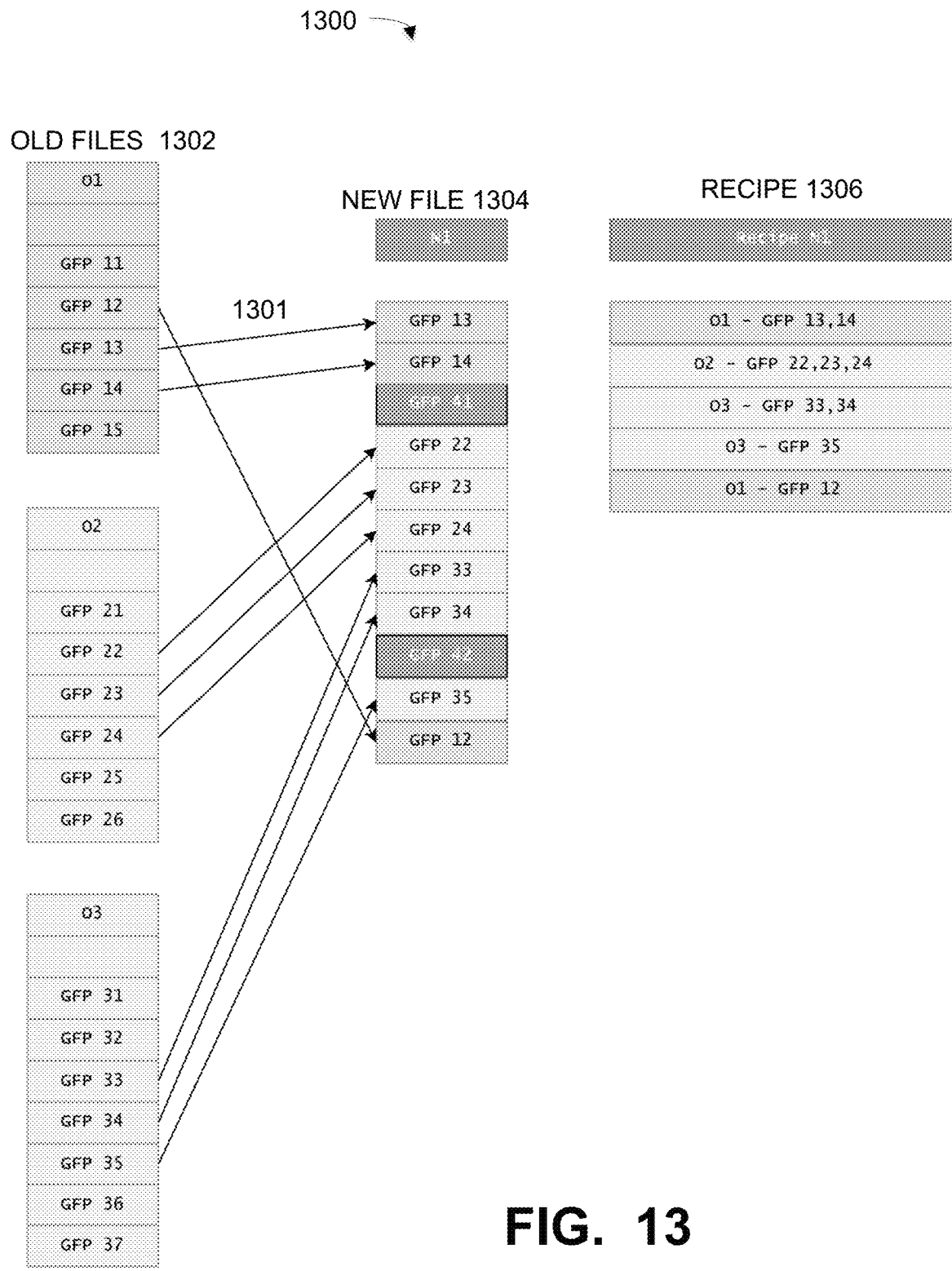
FIG. 13 illustrates comparing old backups against new backups to generate a recipe, under some embodiments.

FIG. 13 illustrates comparing old backup files against new backup files to generate a recipe, under some embodiments. Diagram 1300 is a graphical representation of the example given above for old backups 1302 denoted O1, O2, and O3 with new backups 1304 denoted N1. For this example, the specific GFPs present in both the old and new backups are identified as shown by the correspondence arrows 1301, such as GFP 12 from O1 that is also present in N1, and so on. These matches are then used to formulate the recipe 1306 for backup N1, as shown in FIG. 13 and described above.

Figure 14:
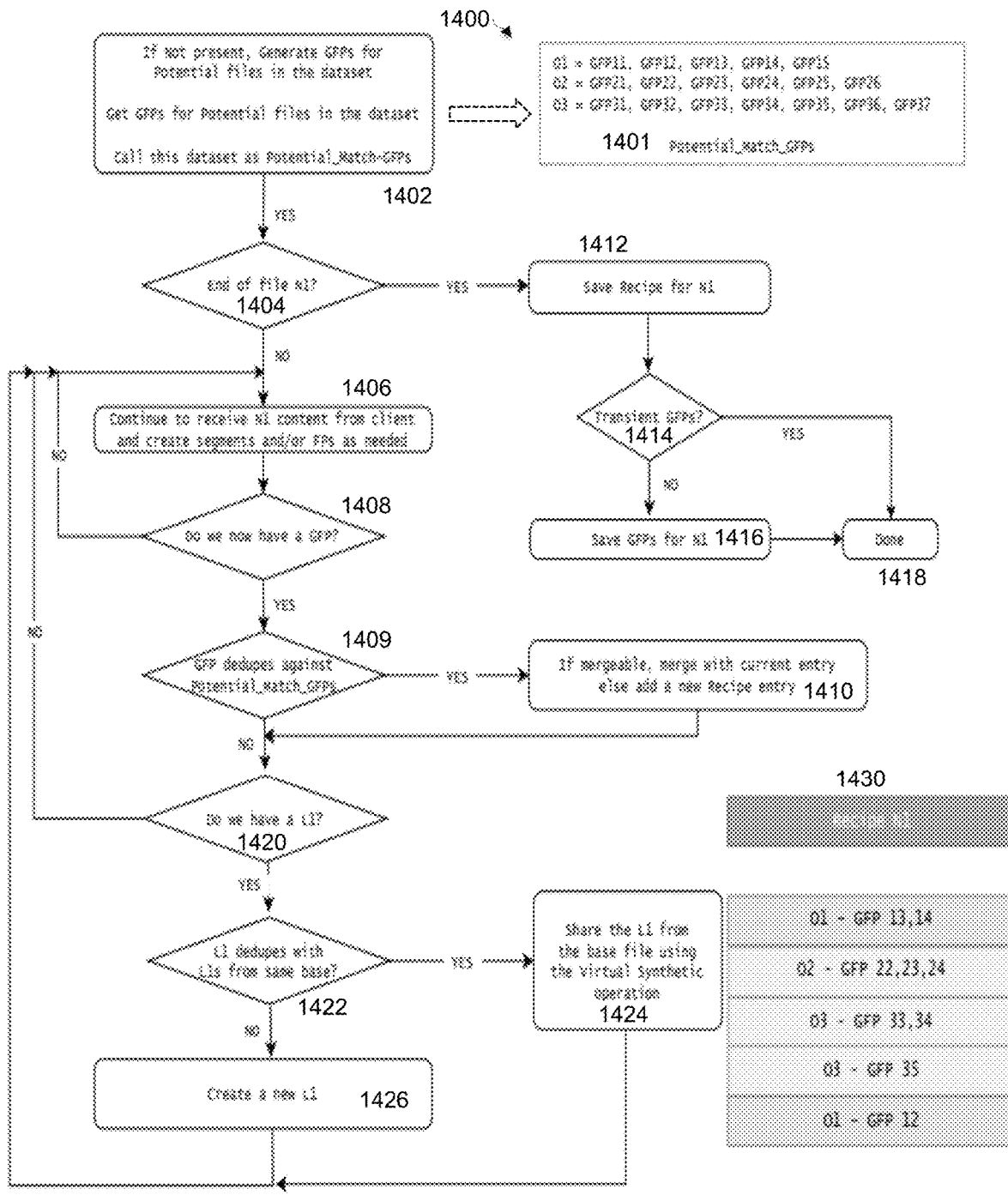
FIG. 14 is a flowchart illustrating a server-side process of identifying recipes for a file, under some embodiments.

FIG. 14 is a flowchart illustrating a server-side process of identifying recipes for a file, under some embodiments. For this embodiment, the GFPs for the N1 are not known, but are generated in-transit (on the server) as they arrive on the server. Process 1400 starts in step 1402 with generating, if not present, GFPs for potential files in the data set, getting these GFPs and calling this dataset "potential_match_GFPs" as illustrated in example list 1401. The process in step 1404 next determines if the end of file N1 has been reached. If so, the recipe for N1 is saved 1412. It next determines if there are transient GFPs, which are GFPs that are not to be kept, 1414. If so, the process is finished 1418, and the recipe is saved, as illustrated in example recipe 1430 (which corresponds in this example to recipe 1306 of FIG. 13). If the GFPs are to be kept (i.e., not transient), as determined in block 1414, the GFPs are saved for the recipe 1430, and then the process finishes, 1418.

If, in step 1404, it is determined that the end of file N1 is not reached, the system continues to receive N1 content from the client and creates segments and/or fingerprints as needed, 1406. In step 1408 it is determined whether or not a GFP has been formed. If not, the process iterates from step 1406. When a GFP is formed, it is deduplicated against GFPs in the potential_match_GFPs group 1401, in decision block 1409. If deduplication is possible, the process merges the next GFP with the current entry or adds a new recipe entry, 1410. Process 1400 then continues and performs L1 deduplication.

FIG. 14 includes steps that deduplicate L1 segments comprising a virtual synthetic representation of a file, under some embodiments. A file is made up of L0 segments representing the variable sized user data, and the L1 made up of a group of L0s. The file may also have GFPs if these were formed and uploaded at the time of backup.

The L1 deduplication process starts with determining whether or not there is an L1 segment 1420, such as shown as L1 sequences 1606 for example backup file N1 in FIG. 16. If not, the process iterates back to process the next GFP from step 1406. If there is an L1, the process then deduplicates this L1 against the L1 from the base file or files to determine if there are any duplicates, 1422. If there are duplicate L1 segments, the L1 from the base file is shared using a virtual synthetic operation (VS), 1424. If there is no L1 deduplication (as determined in 1422), the process creates a new L1 (1426). The process then iterates back for the next through the N1 file from step 1406.

Once the recipe 1430 is generated and stored for a file, it can be leveraged to convert the representation of a file from a native fingerprint based representation to a virtual synthetic based representation. In this way, the system can save the storage space needed for the fingerprint metadata since it now shares the metadata when a file is represented in a virtual synthetic format.

Figure 15:
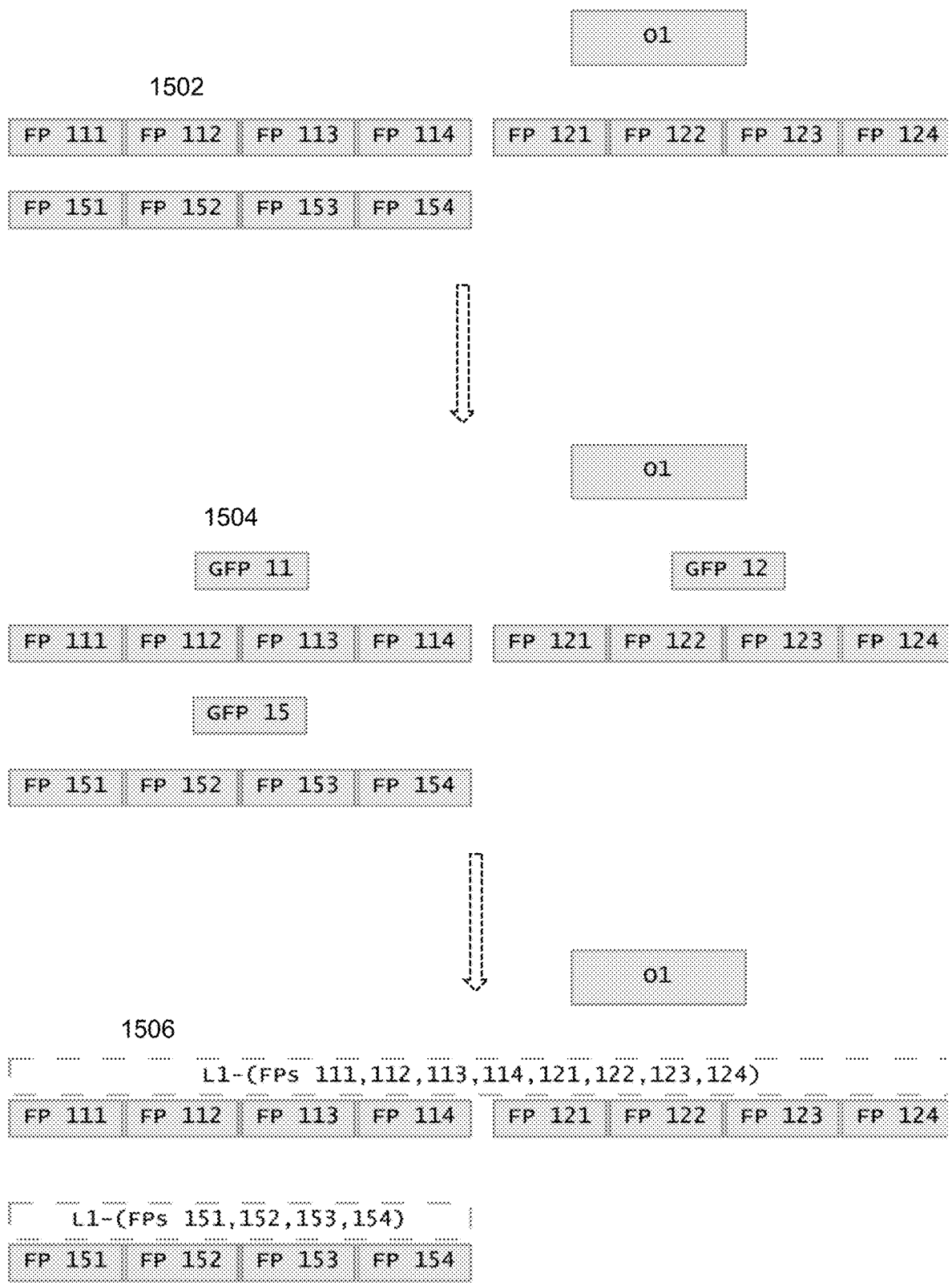
FIG. 15 illustrates the representation of an example file as formed from fingerprints and L1 segments, under an example embodiment.

A file is made up of L0 segments representing the variable sized user data, and the L1 made up of a group of L0s. The file may also have GFPs if these were formed and uploaded at the time of backup. FIG. 15 illustrates the representation of an example file as formed from fingerprints and L1 segments, under an example embodiment. FIG. 15, shows a partial representation of old backup file O1 as having some sets of fingerprints (FP 111 . . . ) 1502. These FPs are then grouped to form GFPs 1504, such as GFP 11, 12, . . . 15, as shown. These groupings then form a sequence of L1 segments 1506, each comprising the individual fingerprints.

FIG. 15 illustrates the example of an L1 composition for backup file O1, and similar representations can be made for files O2 and O3 to correspond to the examples described above. For purpose of illustration, it should be noted that the figures represent a simplified example, where each GFP is composed of just a small number FPs and each L1 is composed of a small number of FPs, and the actual count is variable and could be much larger.

When the new backup file (e.g., N1) was originally backed up, metadata was formed, and this metadata is also represented using the fingerprint format. In this case, the fingerprints of N1 for the matching GFP regions with O1, O2 and O3 are stored as metadata one more time, taking up some amount of storage space. This new file N1 can be represented similarly to how file O1 was represented in FIG. 15, i.e., as a sequence of FPs leading to a sequence of GFPs leading to a sequence of L1s.

Once the recipes for N1 are available, the system knows that certain regions of N1 are the same as certain regions of files O1, O2 and O3, which means that it can share the fingerprint metadata for these matching regions of the file, saving metadata space. This inherent benefit of virtual synthetic backups can now be realized once the recipes are identified.

The internal representation of N1 can then be switched from a fingerprint format to a virtual synthetic format as shown in FIG. 16, which illustrates a portion of file N1 first represented as a sequence of fingerprints 1602, then as a sequence of group fingerprints 1604, and then as a sequence of L1s 1606, under an example embodiment.

After this switch to a virtual synthetic format, as shown in the example of FIG. 16, the file N1 begins to share L1s with the base files O1, O2 and O3. In an example L1 (131-144) is shared with O1, L1 (231-244) is shared with O2 and L1 (331-344) is shared with old backup file O3. This sharing is realized even in cases where the client does not know the relationship between file N1 and files O1/O2/O3.

As described herein, the auto-generation process system and process 1100 produces recipes that can be used at the time of replication for replicating efficiently since the system knows that a specific file can be synthesized from a set of base files, when the base files already exist on the replication target. The replication process thus becomes a series of commands to construct file N1 using the base files that are already present on the replication target.

The comparison of GFPs between two files to generate the recipes can be done on request from the client, and it can also or instead be done during the idle time of the storage server by intelligently identifying similar files to form these recipes. This may be implemented by using a hint comprising setting a tag on backups from same client, files with same extensions, tagging files from same backup application, and picking files based on timestamp using backup frequency. Once these recipes are formed, they can stay along with the file and be deleted when the file is deleted depending on storage availability.

Any backup application that is not capable of tracking changed blocks can now avail these recipes by triggering them to be generated between a specific set of backups to get insights into tracking changed chunks between backups.

As described, embodiments generate backups using synthesis, where the backup is formed by re-using the unchanged chunks from older generation backups, which has advantages in terms of network bandwidth savings that come from not needing to resend all the segments and saving critical compute resources by freeing them up from needing to segment and fingerprint all data again. The synthetic workflow is also used when replicating a backup to another storage server with the same benefits as a client backup. Recipes are used to identify what chunks from older generation backups need to be stitched together to form the new backups, and group fingerprints are generated and used to identify chunks that can be synthesized. This makes it possible to get the recipes between any set of files present in the storage server. Such recipes can be auto generated on the storage server, as described above, by comparing the group fingerprints of any two backup files.

The recipes can be generated for any file present on the storage server, irrespective of how it was backed up (with or without synthesis). It is also possible to generate recipes from any file already present on the storage server, provided there is a GFP match between those files and the file for which recipes are calculated. This provides the capability to expand the number of files that can be identified as base files for a particular file. Such a process is not reliant on the client to be aware of synthetic recipes, and enables changed block tracking capabilities for CBT unaware applications. Once the recipes are identified for a file, its representation can be switched from a fingerprint based format to a virtual synthetic format. This provides metadata savings since the fingerprint metadata for this file can be shared with that of the corresponding base files.

Server-Side Inline Targeted Deduplication Using GFPs

Data storage systems, however, may include one or more backup clients that are not so capable. That is, the system may include backup clients that cannot calculate or use group fingerprints. Such clients may include certain NFS (network file system) clients, or other similar clients, which will be referred to as 'generic' clients. For this case, the system 100 includes a comprehensive server-side process 125 that can generate the group FPs for the newly incoming data, perform the comparison on the server with server resident group FPs, and convert the new backup into a virtual synthetic backup for generic clients. For this embodiment, the targeted deduplication process that was performed on the client 134 is now performed on the backup server 102.

Figure 17:
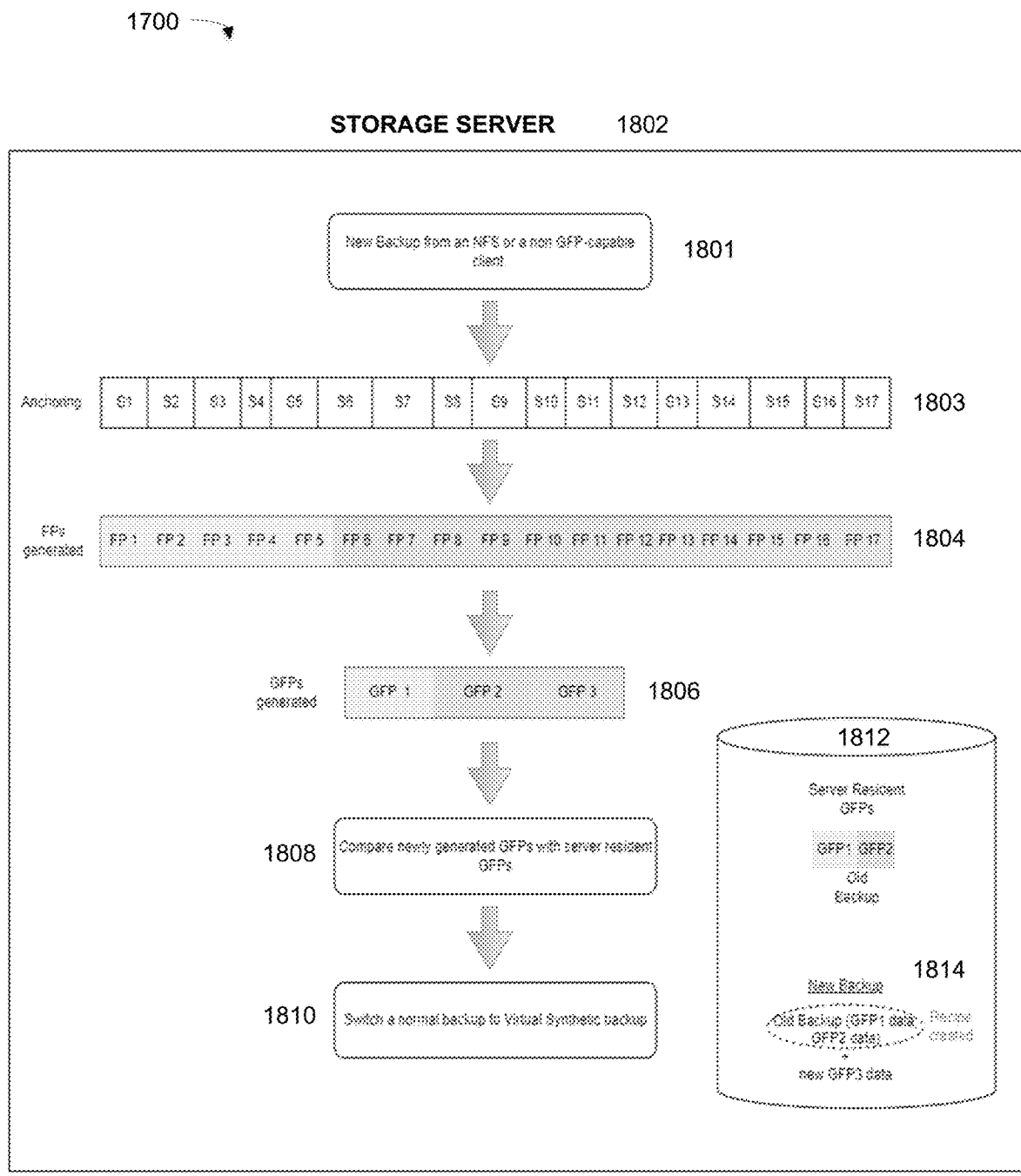
FIG. 17 is a diagram that illustrates a system for server-side, inline targeted deduplication using server-side group fingerprints, under some embodiments.

FIG. 17 is a diagram that illustrates a system for server-side, inline targeted deduplication using server-side group fingerprints, under some embodiments. As shown in diagram 1700, within server 1802, a new backup is initiated for a non-GFP capable client, 1801. A number (17) of segments 1803, denoted S1 to S17 ('anchoring'), are provided for backup. The server generates a corresponding fingerprint (FP) 1804 for each segment resulting in 17 fingerprints (FP1 to FP17) as shown for this example. These fingerprints are then grouped into respective groups 1806. For the example of FIG. 17, the 17 fingerprints are divided into three similarly-sized groups of fingerprints each, resulting in group fingerprints 1, 2, and 3, denoted GFP1, GFP2, and GFP3, as shown, but any other grouping is also possible.

A comparator component 1808 compares the newly generated group FPs 1806 with current server-resident group FPs. These current server-resident GFPs are from a previous or older backup as shown in storage 1812. In this example, the server-resident GFPs comprise GFP1 and GFP2 from an old backup.

The system then switches a normal backup to a virtual synthetic backup, 1810. As shown in FIG. 17, the new backup comprises the old backup (GFP1 data+GFP2 data) plus the new GFP3 data. For this example, the comparator 1808 determines that the data for GFP3 is the only non-duplicated data between the new backup and the old backup, so the recipe in this case comprises '(GFP1 data+GFP2 data)' and the new backup uses this old common data plus the new non-duplicated data, which is for GFP3.

Under the methods described, once the new backup is generated using virtual synthesis, it can also store the recipes from which it was generated. These recipes can be used at the time of replication for replicating efficiently since we know that a specific file can be synthesized from a set of base files, when the base files already exist on the replication target. The replication becomes a series of commands to construct file N1 using the base files that are already present on the replication target. Any backup application that is not capable of tracking changed blocks can now avail these recipes resulting from the virtual synthetic backup to get insights into tracking changed chunks between backups.

Figure 18:
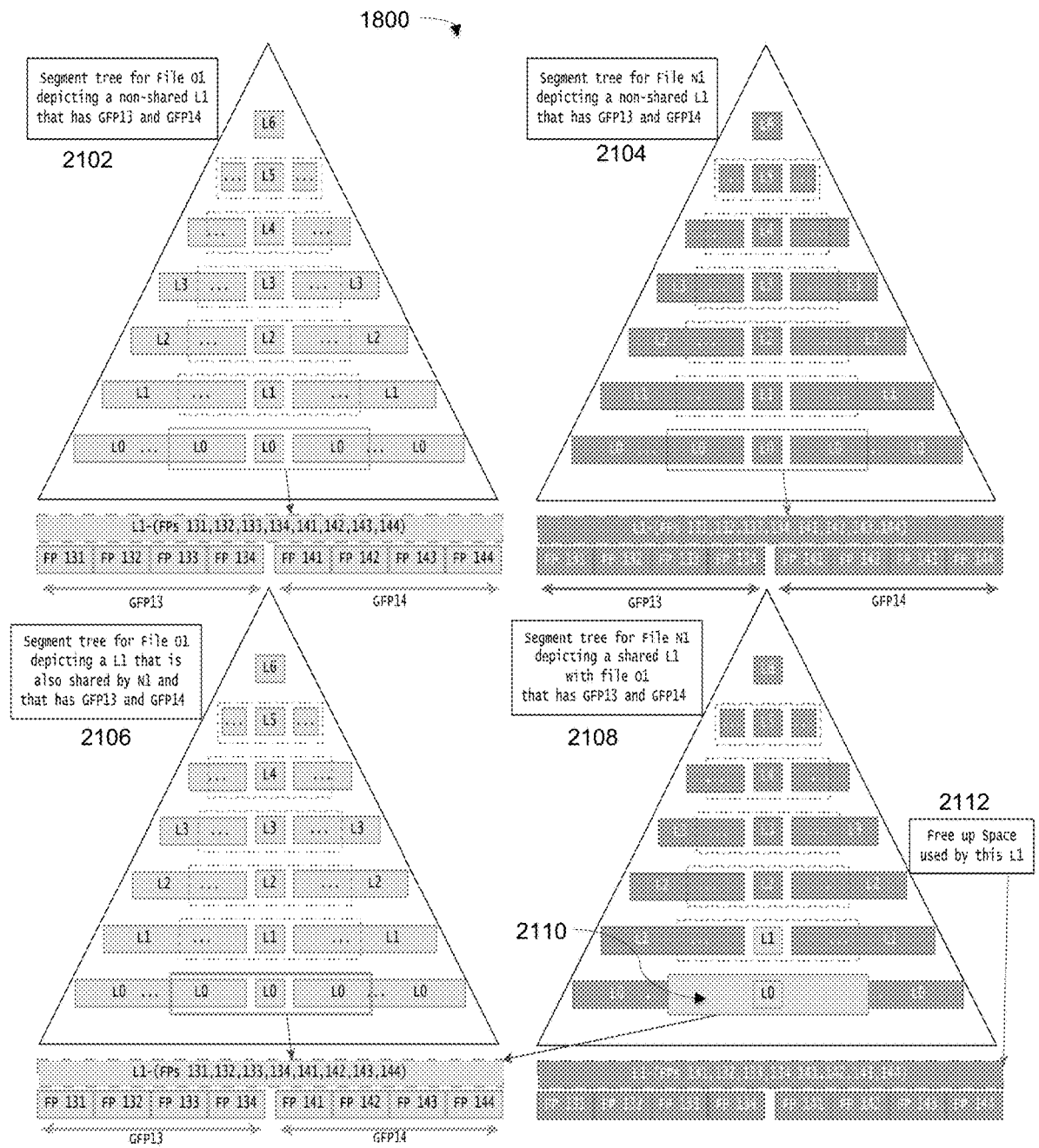
FIG. 18 illustrates an example implementation of an L1 deduplication process, under some embodiments.

As shown in FIG. 14, step 1422 involves deduplicating L1 segments. FIG. 18 illustrates an example implementation of an L1 deduplication process, under some embodiments. Such an example illustrates L1 deduplication for the L1 deduplication loop from step 1422 in FIG. 14.

As shown in FIG. 18, diagram 1800 includes a segment tree 2102 for file O1 depicting non-shared L1 segment that has GFP13 and GFP14, and a segment tree for file N1 depicting a non-shared L1 segment that has GFP13 and GFP14. Segment tree 2106 for file O1 depicts an L1 segment that is also shared by N1 and that has GFP13 and GFP14, and this is shown for segment tree 2108 for file N1 as the shared L1 segment 2110. Since this L1 is duplicated in segment tree 2108, it can be deleted in favor of the L1 segment(s) in segment tree 2106. This L1 deduplication results in the savings of space 2112 used by the L1 segment, as shown.

Embodiments thus provide a system and method to perform inline targeted deduplication of storage data using server-resident GFPs for clients that cannot calculate or use GFPs. For this embodiment, the server generates the GFPs for the newly incoming data, does a comparison on the server, with server resident GFPs, and converts a new backup into a virtual synthetic backup.

Embodiments of the processes and techniques described above can be implemented on any appropriate backup system operating environment or file system, or network server system. Such embodiments may include other or alternative data structures or definitions as needed or appropriate.

Figure 19:
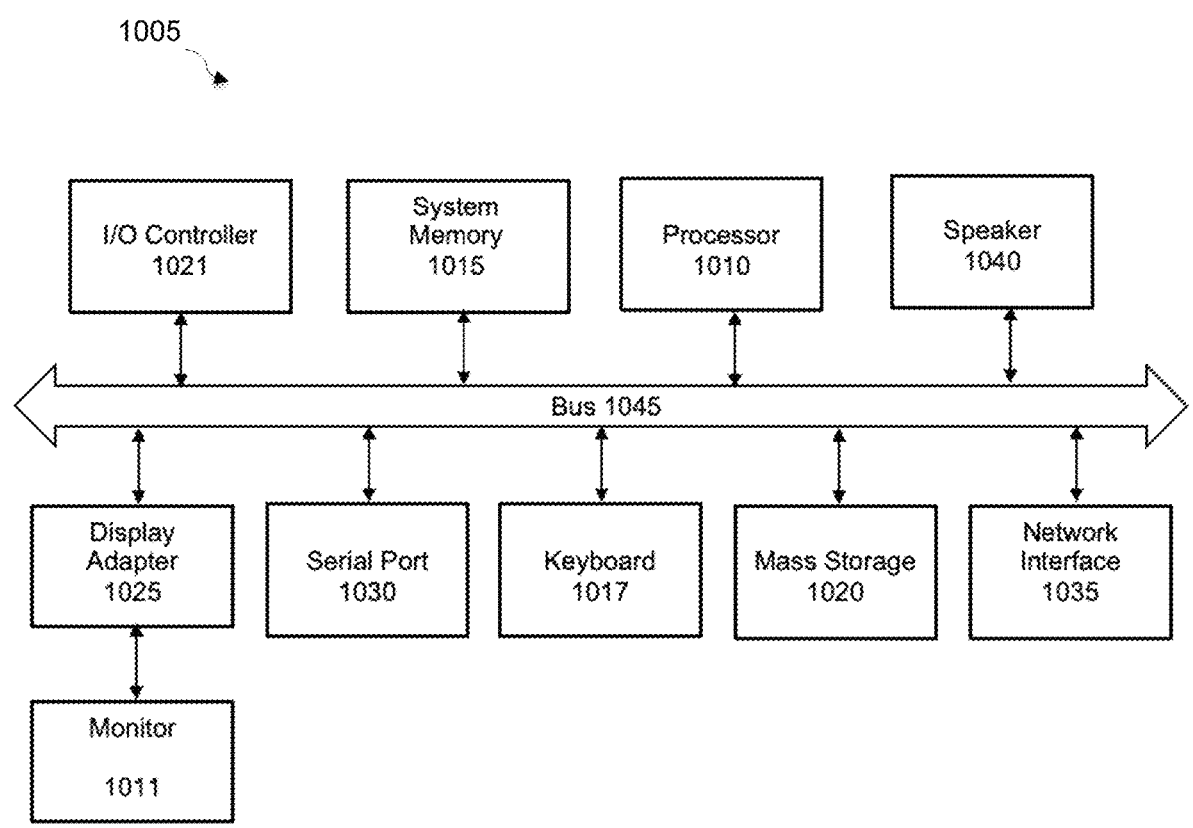
FIG. 19 is a system block diagram of a computer system used to execute one or more software components of described processing operations, under some embodiments.

The network of FIG. 1 may comprise any number of individual client-server networks coupled over the Internet or similar large-scale network or portion thereof. Each node in the network(s) comprises a computing device capable of executing software code to perform the processing steps described herein. FIG. 19 shows a system block diagram of a computer system used to execute one or more software components of the present system described herein. The computer system 1005 includes a monitor 1011, keyboard 1017, and mass storage devices 1020. Computer system 1005 further includes subsystems such as central processor 1010, system memory 1015, I/O controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1005. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1005 is only one example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software. An operating system for the system 1005 may be one of the Microsoft Windows®, family of systems (e.g., Windows Server), Linux, Mac OS X, IRIX32, or IRIX64. Other operating systems may be used. Microsoft Windows is a trademark of Microsoft Corporation.

The computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.x), near field communication (NFC), radio-frequency identification (RFID), mobile or cellular wireless. For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of making inline deduplicated backups of protected data using group fingerprints resident in a storage server, the method comprising:
   generating group fingerprints on a storage server and for a backup client that is not capable of generating group fingerprints, from individual fingerprints generated for each segment of protected data divided into variable size segments and then grouped together, wherein each fingerprint comprises a signature for a respective data segment;
   maintaining the group fingerprints for files resident on the storage server, wherein the storage server is part of a deduplicated backup system comprising a Data Domain file system (DDFS) and a Data Domain Bandwidth Optimized Open Storage Technology (DDBoost) library that links with the application to reduce bandwidth required for data ingests, and which translates application read and write request to DDBoost application program interfaces (APIs);
   comparing, in the storage server, respective group fingerprints for backup files already resident on the storage server with a new backup file to be backed up from the backup client to determine duplicated data between a new file and those already residing on the system;
   comparing, in the storage server, respective group fingerprints for existing backup files resident on the server with new backup file to be backed up from the backup client to determine duplicated data between these files; and
   creating the new backup file using virtual synthetics at the time of backup.

2. The method of claim 1 further comprising:
   automatically generating a recipe for the new file based on the comparison indicating what data in the exiting files duplicates with the new one, wherein the recipe comprises a specific sequence of steps used to generate the new backup file; and
   replaying the recipe during the replication process of the deduplicated backup system.

3. The method of claim 2 further comprising:
   generating, for new segments to be backed up, new group fingerprints;
   determining if any new group fingerprints match the stored group fingerprints; and
   making, if there is a match resulting in matching fingerprints, a new backup dataset out of segments corresponding to the matching fingerprints, otherwise, making a backup using a per-segment deduplication process for segments corresponding to fingerprints that do not match.

4. The method of claim 3 further comprising storing the new group fingerprints on the storage server for use in a subsequent comparison operation for a next incremental of the second backup.

5. The method of claim 3 wherein the virtual synthetic backup is made by combining data from a current backup using previous backup data already stored on the server, and using Change Block Tracking (CBT) to determine data that has changed between the previous and current backup.

6. The method of claim 5 wherein the recipe is used to generate data of the backup file, and is replayed by replication logic of the deduplicated backup system to create a duplicate backup file on a secondary deduplicated backup system.

7. The method of claim 6 wherein the recipe comprises virtual copy commands along with offset and length information of newly written data.

8. The method of claim 7 wherein the recipe comprises segments corresponding to group fingerprints present in the previous backup data that are added to group fingerprints of the current backup data.

9. The method of claim 8 wherein the recipe has a format comprising:
   Current File=offset:Basefile offset+length, offset:Basefile offset+length, offset: Basefile+length, and wherein the duplicate offset regions map to duplicate GFPs identified.

10. The method of claim 1 wherein the signature for each respective data segment is generated using a cryptographic hash function, and wherein the fingerprints are stored in a L0 to L6 layered segment tree, and further wherein the group fingerprints are grouped using a defined grouping algorithm, the method further comprising:
    obtaining a hint from a backup client working together with the server to use the hint to identify a file and it's set of group fingerprints to use for the comparing;
    receiving the hint in the server; and fetching group fingerprints from the server based on the hint.

11. The method of claim 10 wherein the hint constitutes an insight into workflow of the client and the server, and comprises at least one of: backup location information, a filename and path of a previous backup, or other identifying information about one or more previous backups.

12. A system making backups of protected data from a backup client for storage through a storage server method making inline deduplicated backups of protected data using group fingerprints resident in a storage server, comprising:
  a storage server component generating group fingerprints for a backup client that is not capable of using group fingerprints, from individual fingerprints generated for each segment of protected data divided into variable size segments and then grouped together, wherein each fingerprint comprises a signature for a respective data segment, and maintaining the group fingerprints for files resident on the storage server;
  a comparator component of the storage server comparing respective group fingerprints for files existing on the storage server and a new file to be backed up from the backup client to determine duplicated data between the new file and existing files;
  a converter component converting the new backup file to a virtual synthetic backup during a backup time of the new; and
  a further storage server component automatically generating a recipe for the new file based on the comparison indicating what data in the exiting files duplicates with the new one, wherein the recipe comprises a specific sequence of steps used to generate the new backup file; and replaying the recipe during a replication process of a deduplicated backup system comprising a Data Domain file system (DDFS) and a Data Domain Bandwidth Optimized Open Storage Technology (DDBoost) library that links with the application to reduce bandwidth required for data ingests, and which translates application read and write request to DDBoost application program interfaces (APIs).

13. The system of claim 12 wherein the backup data comprises data formed by a full backup followed by one or more incremental, and wherein the storage server component further generates, for new segments to be backed up, new group fingerprints, determines if any new group fingerprints match the stored group fingerprints, and makes, if there is a match resulting in matching fingerprints, a new backup dataset out of segments corresponding to the matching fingerprints, otherwise, makes a backup using a per-segment deduplication process for segments corresponding to fingerprints that do not match, and further stores the new group fingerprints on the storage server for use in a subsequent comparison operation for a next incremental backup.

14. The system of claim 13 wherein the virtual synthetic backup is made by combining data from a current backup using previous backup data already stored on the server, and using Change Block Tracking (CBT) to determine data that has changed between the previous and current backup.

15. The system of claim 14 wherein the recipe is used to generate data of the backup file, and is replayed by replication logic of the deduplicated backup system to create a duplicate backup file on a secondary deduplicated backup system, and wherein the recipe comprises virtual copy commands along with offset and length information of newly written data.

16. The system of claim 13 wherein the signature for each respective data segment is generated using a cryptographic hash function, and wherein the fingerprints are stored in a L0 to L6 layered segment tree, and further wherein the group fingerprints are grouped using a defined grouping algorithm.

17. The system of claim 16 wherein the component further obtains a hint from a backup client working together with the server to use the hint to identify a set of group fingerprints to use for comparing the two files, receives the hint in the storage server; and fetches the group fingerprints based on the hint.

18. The system of claim 17 wherein the hint constitutes an insight into workflow of the client and the server, and comprises at least one of: backup location information, a filename and path of a previous backup, or other identifying information about one or more previous backups.

19. A computer program product, comprising a non-transitory computer-readable medium having a computer-readable program code embodied therein, the computer-readable program code adapted to be executed by one or more processors to implement a method of making inline deduplicated backups of protected data using group fingerprints resident in a storage server, the method comprising:
  generating group fingerprints on a storage server and for a backup client that is not capable of using group fingerprints, from individual fingerprints generated for each segment of protected data divided into variable size segments and then grouped together, wherein each fingerprint comprises a signature for a respective data segment;
  maintaining the group fingerprints for files resident on the storage server, the storage server comprising a Data Domain file system (DDFS) and a Data Domain Bandwidth Optimized Open Storage Technology (DDBoost) library that links with the application to reduce bandwidth required for data ingests, and which translates application read and write request to DDBoost application program interfaces (APIs);
  comparing, in the storage server, respective group fingerprints for file's already resident on the storage server with a new backup file to be backed up from the backup client to determine duplicated data between the files; and
  converting the new backup file to a virtual synthetic backup during a backup time of the new file.

20. The product of claim 19 wherein the method further comprises:
  automatically generating a recipe for the new file based on the comparison indicating what data in the exiting files duplicates with the new one, wherein the recipe comprises a specific sequence of steps used to generate the new backup file; and
  replaying the recipe during the replication process of the deduplicated backup system.

* * * * *